(12) United States Patent
Calagaz

(10) Patent No.: US 11,354,999 B2
(45) Date of Patent: Jun. 7, 2022

(54) SYSTEM AND METHOD FOR TRACKING FISHING REGULATIONS

(71) Applicant: Fishing Chaos, Inc, Mobile, AL (US)

(72) Inventor: John Calagaz, Mobile, AL (US)

(73) Assignee: Fishing Chaos, Inc, Mobile, AL (US)

( * ) Notice: Subject to any disclaimer, the term of this patent is extended or adjusted under 35 U.S.C. 154(b) by 0 days.

(21) Appl. No.: 17/163,265

(22) Filed: Jan. 29, 2021

(65) Prior Publication Data

US 2021/0150876 A1 May 20, 2021

Related U.S. Application Data

(63) Continuation-in-part of application No. 16/653,553, filed on Oct. 15, 2019.

(51) Int. Cl.
| | | |
|---|---|---|
| G08B 21/00 | (2006.01) | |
| G08B 21/18 | (2006.01) | |
| G06F 16/9537 | (2019.01) | |
| G06F 16/9538 | (2019.01) | |
| A01K 97/00 | (2006.01) | |
| G08B 5/22 | (2006.01) | |
| G07C 9/28 | (2020.01) | |
| G06Q 50/26 | (2012.01) | |

(52) U.S. Cl.
CPC ............ *G08B 21/182* (2013.01); *A01K 97/00* (2013.01); *G06F 16/9537* (2019.01); *G06F 16/9538* (2019.01); *G07C 9/28* (2020.01); *G08B 5/228* (2013.01); *G08B 5/229* (2013.01); *G06Q 50/26* (2013.01)

(58) Field of Classification Search
CPC ...... G08B 21/182; G08B 5/228; G08B 5/229; G06F 16/9537; G06F 16/9538; G07C 9/28; G07C 2009/00984; A10K 97/00; G06Q 50/26; Y02A 40/80
See application file for complete search history.

(56) References Cited

U.S. PATENT DOCUMENTS

| | | | | |
|---|---|---|---|---|
| 2004/0220856 | A1* | 11/2004 | Moore | G06Q 30/0251 705/14.23 |
| 2018/0234806 | A1* | 8/2018 | Olsen | G08B 29/046 |
| 2020/0252576 | A1* | 8/2020 | Isaac-Lowry | H04N 5/2257 |

* cited by examiner

*Primary Examiner* — Ojiako K Nwugo
(74) *Attorney, Agent, or Firm* — AdamsIP, LLC; Edward B Garner, III; James H Adams

(57) ABSTRACT

A system and method for managing and tracking fishing/hunting rules and regulations is provided. The system generally comprises a global positioning system (GPS), a processor operably connected to the GPS, a power supply, a display operably connected to the processor, and a non-transitory computer-readable medium coupled to the processor and having instructions stored thereon. The system and method are designed to easily and conveniently compile and store information or data related to wildlife sports. The system may use this information to help a user comply with state and federal rules and regulations via the creation of registration strategies and via indicia.

20 Claims, 11 Drawing Sheets

SYSTEM AND METHOD FOR TRACKING FISHING REGULATIONS

CROSS REFERENCES

This application is a continuation in part of and claims the benefit of U.S. application Ser. No. 16/653,553, filed on Oct. 15, 2019, which application is incorporated herein by reference.

FIELD OF THE DISCLOSURE

The subject matter of the present disclosure refers generally to a system and method for managing and tracking rules and regulations related to wildlife sports.

BACKGROUND

Fishing laws or regulations protect natural resources and help anglers enjoy more success. If these regulations did not exist, anglers would be able to fish for all species, at all times, and for any quantity, which would deplete fish populations and inevitably cause endangerment or extinctions of multiple species of marine life. This outcome not only deprives others of enjoyment of the sport due to a less diverse fishing experience, but also causes significant harm to the environment by offsetting the delicate balance of the ecosystem. Types of fishing regulations designed to prevent exploitation of our aquatic resources include, but are not limited to, licensing, fishing seasons, catch limits, and size limits, or any combination thereof. Types of hunting regulations designed to prevent exploitation of our wildlife resources include, but are not limited to, licensing, hunting seasons, bag limits, and size limits, or any combination thereof. All of these regulations are intended to conserve and improve fauna populations so that this natural resource may be sustainably exploited for the foreseeable future. For instance, catch limits prevent anglers from taking too many fish at one time, which makes it possible for more people to enjoy our aquatic resource. Catch limits also enable conservation officers to arrest "poachers" for taking more than their allotted amount of the resource. However, it is important to keep in mind that not all of these "poachers" intentionally take more than their allotted amount. Because the rules and regulations are constantly changing, differ greatly from state to state, and may even differ greatly for different bodies of water within a state, it can be difficult to for anglers to keep up with the various regulations such as catch limits.

Wildlife sports rules and regulations are set and managed by each individual state. In addition to requiring valid licenses, all states have different rules and regulations, and many of them change by season or month. Additionally, some states have fishing rules and regulations that apply to everyone within the state regardless of location while other states may have rules and regulations governing different bodies of water within the state, further increasing confusion for anglers trying to decide whether or not keeping and particular species of marine life is legal. For instance, a fisherman angling for bass in a heavily fished lake in a state such as Texas may have a lower limit than a fisherman angling for bass in a less heavily fished lake also within Texas. To complicate matters further, fisherman angling in coastal waters must be mindful of their location because they might be located in federal waters or state waters depending on their distance to the shoreline. This is important because state and federal rules and regulations often differ, meaning a fisherman may keep a fish that would otherwise be forbidden just fifty feet closer to a state's shoreline. For instance, a fisherman angling for red snapper three miles off the coast of Alabama during the state's authorized red snapper season may have a completely different catch limit than a fisherman angling for red snapper in federal waters five miles off the coast of Alabama.

States often hire biologists to study bodies of water to check fauna numbers and the health of fauna populations before making rules and regulations to manage their natural resources. These biologists will occasionally suggest new laws if they believe it will help keep fauna populations healthy in order to ensure the state's natural resources may flourish so that they may be sustainably exploited for the foreseeable future. For instance, biologists may suggest that a state make seasonal fishing laws that are designed to protect a particular species of fish during spawning or are designed to limit the number of a particular species of fish caught in heavily fished areas. For instance, biologists may suggest size limit fishing regulations meant to protect a particular species of fish until they reach spawning size. This is especially important to fish such as bass, lake trout, muskellunge, northern pike, sturgeon, walleye, and many other large game fish since they take longer to become adults. Some of these larger fish may take up to three years before they reach spawning size and may only spawn once a year once physical maturity is reached, which is why regulations limiting the minimum size in which a fisherman may legally keep these species is a necessity for the survival of the species and the health of the environment. Other fish species, such as bluegill and many other pan fish, mature earlier and spawn more than once a year, so these species may not need this type of protection. On the other hand, these species of fish may need protection in the form of a catch limit regulation in areas that experience very heavy fishing levels in order to ensure the species isn't entirely removed from the ecosystem.

As one can ascertain, keeping up with fish populations can be a very difficult and time-consuming task. Some states require fisherman fill out a form whenever they catch a particular species of fish, which helps biologists and legislators better track fish populations. If this data was more easily obtainable in an electronic file format, biologists might be able to better inform the legislators of the current health of the state's aquatic resources and make better recommendations as to which regulations may better ensure a sustainable exploitation of those resources.

Accordingly, there is a need in the art for a system and method for managing information related to wildlife sports so that information may be shared in a manner that will increase the communication between anglers, hunters, biologists, and legislators.

SUMMARY

A system and method for managing information related to fishing/hunting activities is provided. Generally, the system and method of the present disclosure are designed to easily and conveniently compile and store information or data related to wildlife sports. Such data may include, but is not limited to, photos, videos, geolocations, taxonomic data, weight, length, baits, lures, guns, and rules and regulations relevant, or any combination thereof. The system may use this information to help a user comply with state and federal rules and regulations designed to protect certain fauna. The system generally comprises a global positioning system (GPS), a processor operably connected to the GPS, a power supply, a display operably connected to the processor, a non-transitory computer-readable medium coupled to the processor and having instructions stored thereon, and a database operably connected to the processor.

A user may connect and subsequently upload data or information related to fishing to a host site, preferably using a mobile device such as a smartphone. The user may access the host site through an application, which may be programmed to automatically upload certain data related to fishing activities, such as geolocation data or equipment data. The system may further comprise hardware, software, or firmware components to facilitate ease and convenience of uploading and organizing catch log data. For instance, the system may comprise a programming module linked to a camera of a mobile device. When a user catches a fish, the user may take a photo of the fish using the camera. The photo may then be uploaded to a database via the application. In a preferred embodiment, the application may be programmed to automatically and simultaneously upload geolocation data when uploading the photo to indicate the location where the fish was caught. In addition, the mobile device may be connected to a network, and the application may be programmed to automatically scan the network to obtain contemporaneous fishing-related data for a specific geolocation based on the geolocation data. For instance, the application may time stamp a photo of a caught fish and upload information relating to rules and regulations relevant to the geolocation and at the specified time. This information may be stored in the database, wherein the user may choose to share the information with others.

In a preferred embodiment, the system further comprises a digital scale operably connected to the computing device and configured to function with the application. When fauna is caught, the fauna may be weighed using the digital scale. Once a weight is determined, the scale and the mobile device are configured to transfer that information from the scale to the mobile device, preferably wirelessly utilizing Bluetooth or similar wireless technology. The weight of the fauna may be uploaded to the database as part of a compendium of data, including a photo of the fauna and any data automatically uploaded by the system. In another preferred embodiment, the system may be configured to determine the length of the caught fauna. This may be done using a comparative size method, where the system uses an object with a known size to compare to the caught fauna. Alternatively, the system may use some type of machine learning technique to determine the size of the caught fauna. The system may use both the weight data and length data to inform a user of whether or not they are in violation of any rules and regulations relevant to the geolocation in which the fauna was caught In another preferred embodiment, the system may further comprise a plurality of wildlife sporting equipment having an RFID tag or similar identifier. The system is configured to identify the wildlife sporting equipment and record data related to its use. For instance, when embedded within a lure, a user may bring the lure in close proximity to the mobile device so that the mobile device detects which lure is currently being used by the user/fisherman for a period of time until a different lure is tagged. Any photograph of a marine species captured during that period of time will automatically be associated with the currently used lure. Data relating to the lure used to catch the fish may then be uploaded and associated with all other data relating to a caught species of marine life in a catch log profile. For instance, when embedded in a rod, the user may tag or scan the rod in the same manner to create a list of rods that he user may choose from within a user interface of the system. The user may then optionally select a rod from the list within the user interface to associate with a particular fish caught. The system may use this equipment information to inform a user of whether or not they are in violation of any rules and regulations relevant to the geolocation in which the species of marine life was caught.

The foregoing summary has outlined some features of the system and method of the present disclosure so that those skilled in the pertinent art may better understand the detailed description that follows. Additional features that form the subject of the claims will be described hereinafter. Those skilled in the pertinent art should appreciate that they can readily utilize these features for designing or modifying other structures for carrying out the same purpose of the system and method disclosed herein. Those skilled in the pertinent art should also realize that such equivalent designs or modifications do not depart from the scope of the system and method of the present disclosure.

DESCRIPTION OF THE DRAWINGS

These and other features, aspects, and advantages of the present disclosure will become better understood with regard to the following description, appended claims, and accompanying drawings where:

DETAILED DESCRIPTION

In the Summary above and in this Detailed Description, and the claims below, and in the accompanying drawings, reference is made to particular features, including method steps, of the invention. It is to be understood that the disclosure of the invention in this specification includes all possible combinations of such particular features. For instance, where a particular feature is disclosed in the context of a particular aspect or embodiment of the invention, or a particular claim, that feature can also be used, to the extent possible, in combination with/or in the context of other particular aspects of the embodiments of the invention, and in the invention generally.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility). The term "comprises" and grammatical equivalents thereof are used herein to mean that other components, steps, etc. are optionally present. For instance, a system "comprising" components A, B, and C can contain only components A, B, and C, or can contain not only components A, B, and C, but also one or more other components. As used herein, the term "wildlife sports" and grammatical equivalents thereof refer to sports in which fauna is captured. For instance, fishermen catch marine life when participating in the wildlife sport of fishing. For instance, hunters catch wildlife when participating the wildlife sport of hunting. As used herein, the term "fauna" and grammatical equivalents thereof refer to Animalia of a particular region and/or habitat. For instance, a smallmouth bass is a fauna that may be found in freshwater swamps, ponds, lakes, reservoirs, creeks and large rivers in the southeastern United States.

As will be evident from the disclosure provided below, the present invention satisfies the need for a system and method capable of managing data related to marine vehicles without human intervention, and thereby improving upon known systems currently employed within the art.

Figure 1:
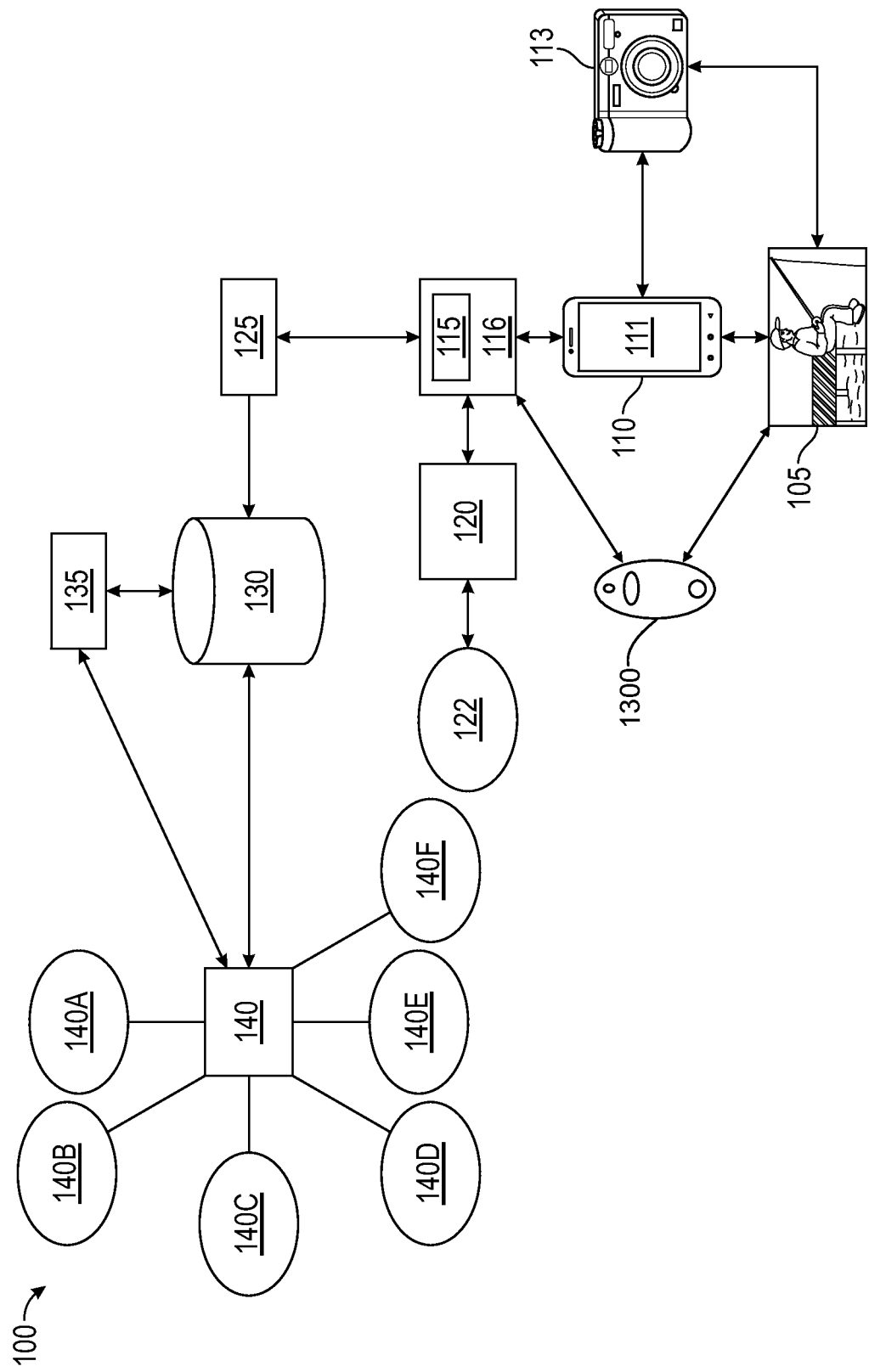
FIG. 1 is a diagram of an example environment in which techniques described herein may be implemented.
Figure 2:
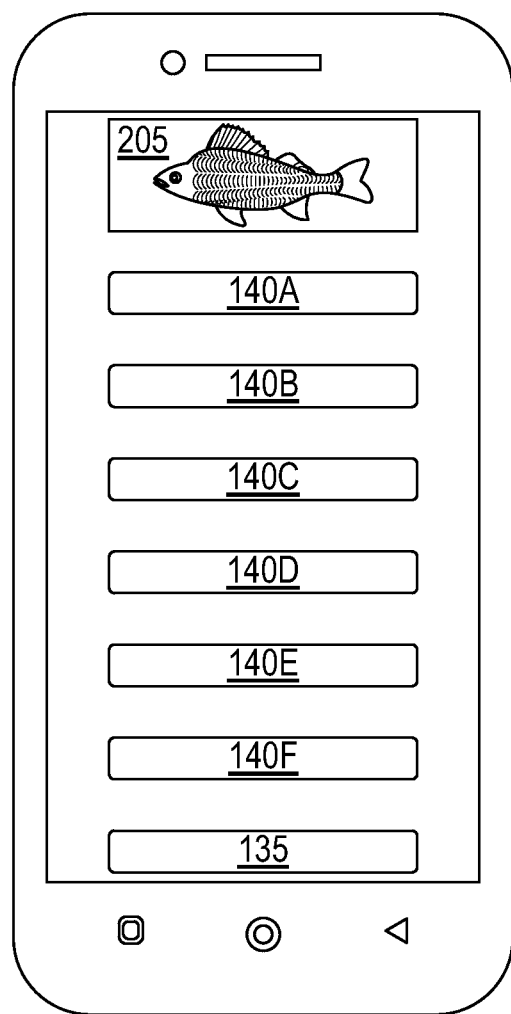
FIG. 2 is an illustrative screen shot of a computer application consistent with the principles of the present disclosure.
Figure 3:
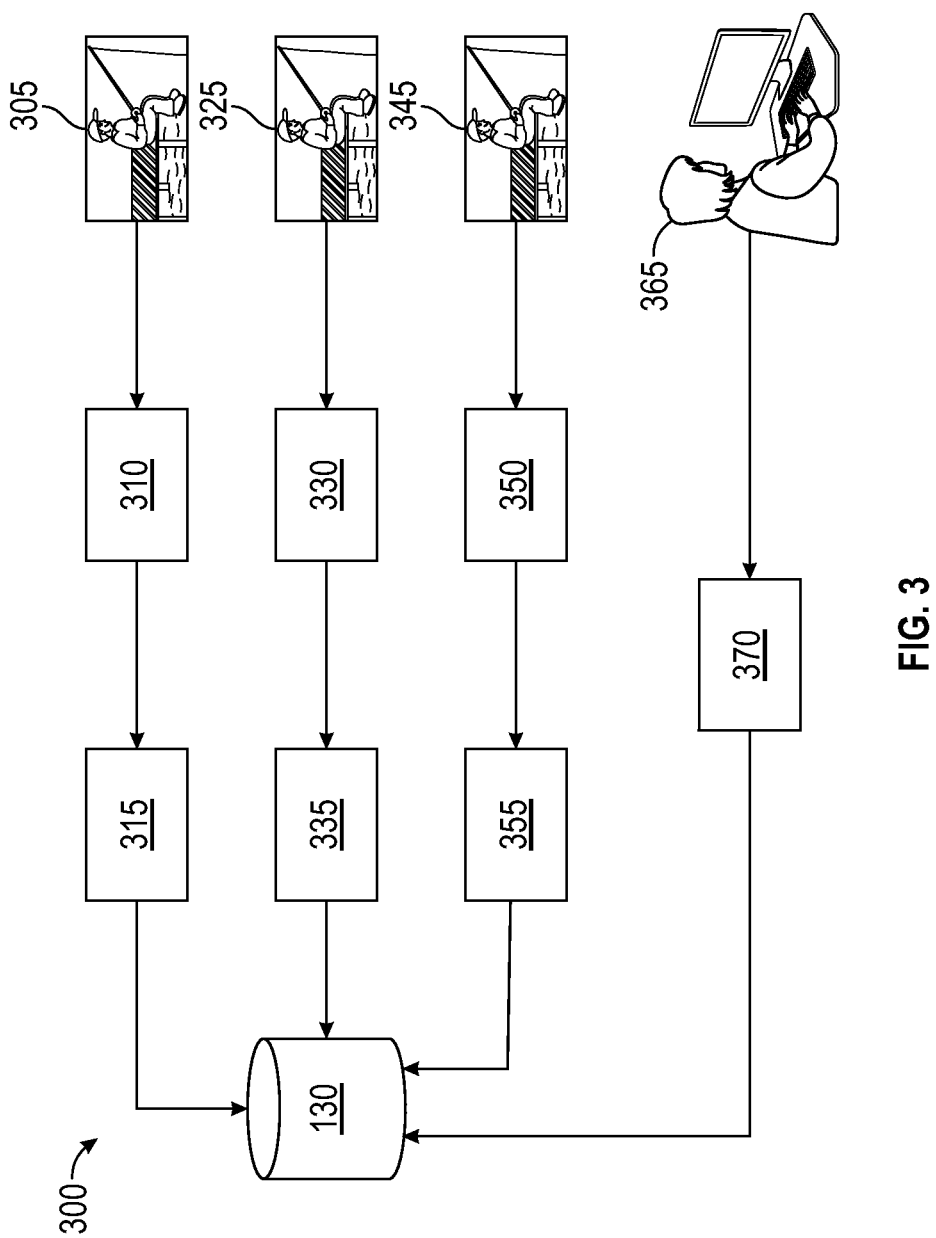
FIG. 3 is a diagram illustrating the manner in which individual access to data may be granted or limited based on user or system roles.
Figure 8:
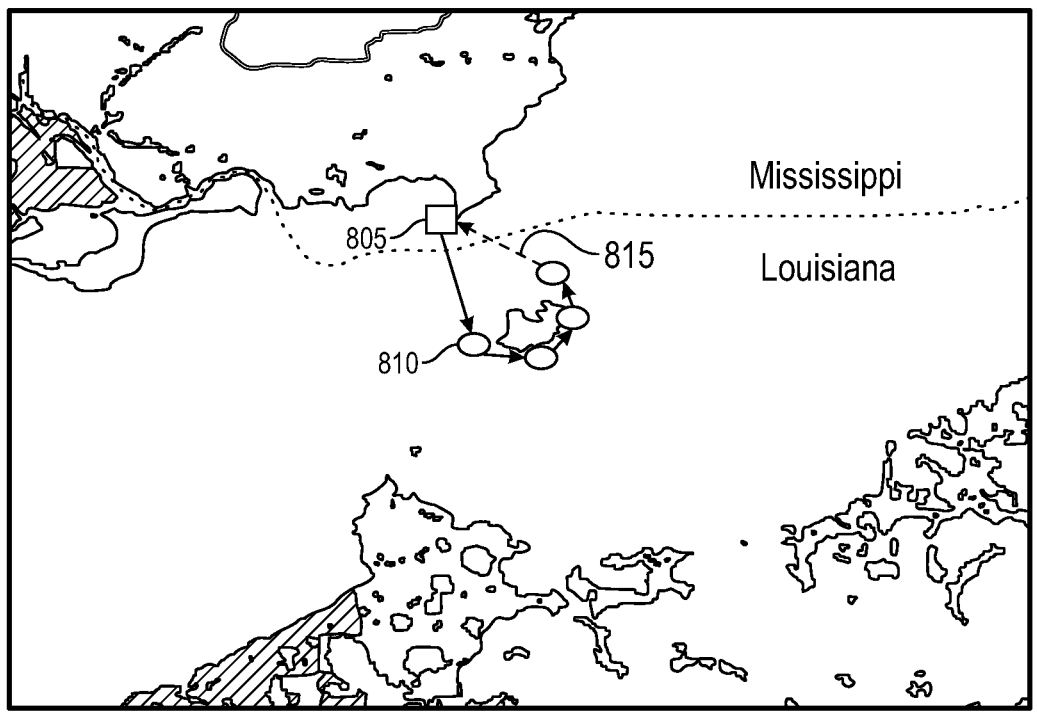
FIG. 8 is an example fishing trip route a user may take illustrating certain geolocations and routes embodying features consistent with the principles of the present disclosure.
Figure 9:
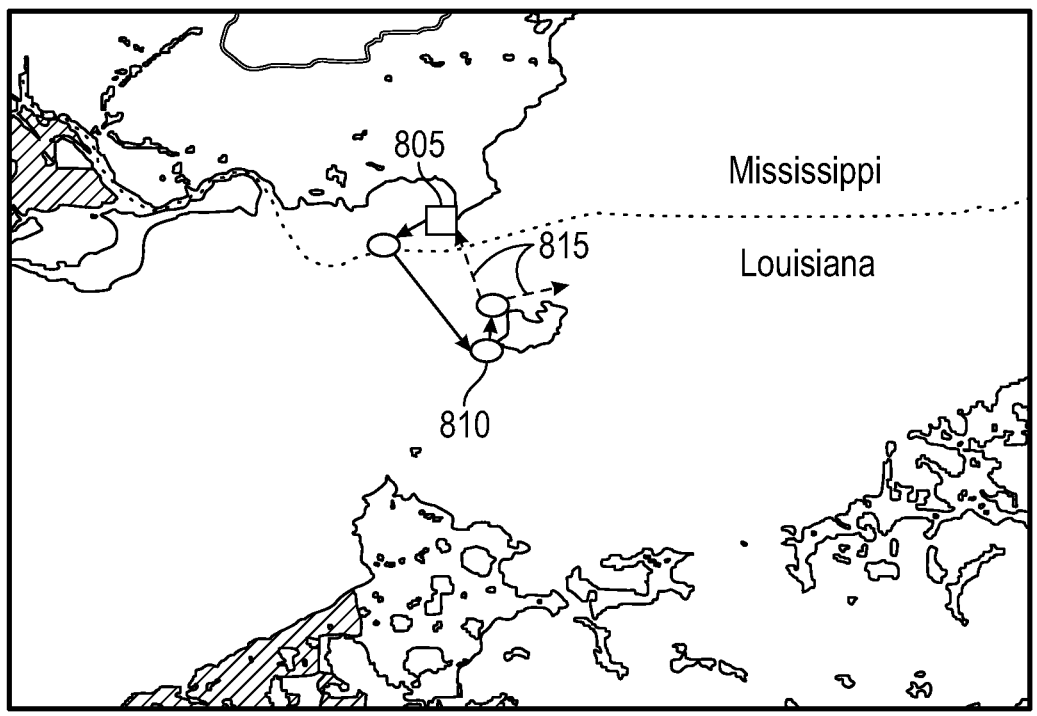
FIG. 9 is an example fishing trip route a user may take illustrating certain geolocations and routes embodying features consistent with the principles of the present disclosure.
Figure 10:
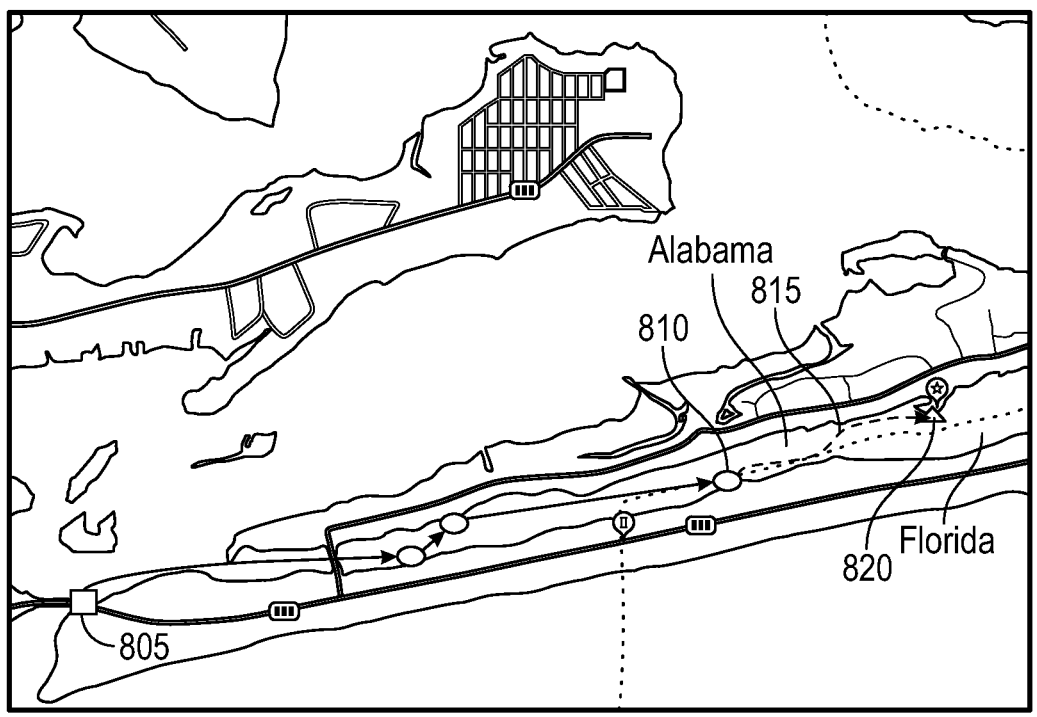
FIG. 10 is an example fishing trip route a user may take illustrating certain geolocations and routes embodying features consistent with the principles of the present disclosure.

FIGS. 1-13 illustrate embodiments of a system 100 for managing and tracking information related to fishing/hunting regulations. FIG. 1 shows an embodiment of the disclosed system 100. The system 100 generally comprises a global positioning system (GPS) 122, a processor 115 operably connected to the GPS 122, a power supply, a display operably connected to the processor 115, a non-transitory computer-readable medium 116 coupled to the processor 115 and having instructions stored thereon, a fob 1300, and a database 130 operably connected to the processor 115. In one embodiment, a computing device 110 having a user interface 111 may be operably connected to the processor 115. In another embodiment, a server 125 may be operably connected to the database 130 and processor 115, facilitating the transfer of information between the processor 115 and database 130. In yet another embodiment, a security system 120 may be operably connected to the database 130 and processor 115. The security system 120 may act in tandem with the system 100 to alert a user 105 when they are about to perform an action that would be in violation of a regulation. FIG. 2 illustrates an example screenshot of a user interface 111 that may be displayed via a computing device 110 such as a mobile phone. FIG. 3 illustrates permission levels 300 that may be utilized by the present system 100 for controlling access to user content 315, 335, 355. FIGS. 8-10 illustrate fishing trip routes a user 105 may take while participating in the wildlife sport of fishing. FIG. 13 illustrates a fob 1300 that may be used to by a user 105 to record audio data and which may be used by the system 100 to alert a user 105 of any potential rules and regulations 135 they may be violating. FIGS. 4-7, 11, and 12 illustrate various methods that may be carried out by the system 100. It is understood that the various method steps associated with the methods of the present disclosure may be carried out as operations by the system 100 shown in FIG. 1.

The processor 115 is configured to perform the operations disclosed herein based on instructions stored within the system 100. The processor 115 may process instructions for execution within the computing device 110, including instructions stored in memory or on a storage device, to display graphical information for a graphical user interface (GUI) on an external input/output device, such as a display. The processor 115 may provide for coordination of the other components of a computing device 110, such as control of user interfaces 111, applications run by a computing device 110, and wireless communication of the computing device 110. The processor 115 may be any processor or microprocessor suitable for executing instructions. In some embodiments, the processor 115 may have a memory device therein or coupled thereto suitable for storing catch log data or other information or material disclosed herein. In some instances, the processor 115 may be a component of a larger computing device 110. A computing device 110 that may house the processor 115 therein may include, but is not limited to, laptops, desktops, workstations, personal digital assistants, servers, mainframes, cellular telephones, tablet computers, or any other similar device. Accordingly, the inventive subject matter disclosed herein, in full or in part, may be implemented or utilized in devices including, but are not limited to, laptops, desktops, workstations, personal digital assistants, servers, mainframes, cellular telephones, tablet computers, or any other similar device.

In an embodiment, the programming instructions responsible for the operations carried out by the processor 115 are stored on a non-transitory computer-readable medium ("CRM") 116, which may be coupled to the server 125, as shown in FIG. 1. Alternatively, the programming instructions may be stored or included within the processor 115. Examples of non-transitory computer-readable mediums 116 include, but are not limited to, magnetic media such as hard disks, floppy disks, and magnetic tape; optical media such as CD ROM discs and DVDs; magneto-optical media such as optical discs; and hardware devices that are specifically configured to store and perform programming instructions, such as read-only memory (ROM), random access memory (RAM), flash memory, and the like. In some embodiments, the programming instructions may be stored as modules within the non-transitory computer-readable medium 116.

In an embodiment, the system 100 may further comprise a computing device 110 operably connected to the processor 115. A computing device 110 may be implemented in a number of different forms, including, but not limited to, servers, multipurpose computers, mobile computers, etc. For instance, a computing device 110 may be implemented in a multipurpose computer that acts as a personal computer for a user 105, such as a laptop computer. For instance, components from a computing device 110 may be combined in a way such that a mobile computing device is created, such as mobile phone. Additionally, a computing device 110 may be made up of a single computer or multiple computers working together over a network. For instance, a computing device 110 may be implemented as a single server or as a group of servers working together over and Local Area Network (LAN), such as a rack server system 100. Computing devices 110 may communicate via a wired or wireless connection. For instance, wireless communication may occur using a Bluetooth, Wi-Fi, or other such wireless communication device. In addition, a GPS 122 may provide geospatial data 140B to a computing device 110, which may be used as appropriate by applications running on the mobile computing device.

In one preferred embodiment, as illustrated in FIG. 13, the system 100 may further comprise a fob 1300 having a shell 1302, control board 1310, input device 1303, and output device 1305. The shell 1302 may provide an enclosure to protect the more delicate components of the control board 1310, input device 1303, and output device 1305. For instance, the shell 1302 may be rigid to protect the internal components of the fob 1300 from impacts. In a preferred embodiment, the shell 1302 is weather proof so that the internal components of the fob 1300 may be protected from the environment. The control board 1310 comprises at least one circuit and microchip. The control board 1310 may regulate the transfer of power to the various components of the fob 1300 and communication with other components of the system 100 via the wireless communication device such as Bluetooth or an antenna. The wireless communication device may be used to transmit information to or receive information from a server and/or database. The microchip of the control board 1310 comprises a microprocessor and memory.

In a preferred embodiment, the microprocessor may receive a computer readable signal that instructs it to record catch log data from a user via the input device 1303. In a preferred embodiment, the microprocessor of the control board 1310 receives said computer readable signal via an input device 1303 acting as a physical switch and connected to the control board 1310, such as a button. Alternatively, the microprocessor may receive the computer readable signal via some other type of input device 1303, which the microprocessor may recognize as a computer readable signal to begin recording catch log data. Devices that may act as an input device 1303 include, but are not limited to, a camera, microphone, keyboard, touchscreen, or ant combination thereof. In a preferred embodiment, the input device 1303 is a microphone. A user may press a button of the fob 1300 to cause the control board 1310 to provide power to the microphone, which may then be used by the control board 1310 to record audio data. The audio data may then be transmitted to the processor of the system 100 from the control board 1310 by way of wireless communication devices. In a preferred embodiment, the processor may extract catch log data from the audio data and add said catch log data to a user's catch log profile. Alternatively, the microprocessor of the fob 1300 may extract the catch log data and send the catch log data to the processor via the wireless communication device.

Once the processor 115 has extracted the catch log data from the audio data, the processor 115 may relay a computer readable signal to the control board 1310 of the fob 1300, which may instruct the control board 1310 to indicate to the user 105 whether or not catch log data was successfully extracted from the audio data and added to the catch log profile 135. The control board 1310 may modulate power to the output device 1305 based on said computer readable signal to convey the desired message of the system 100. Devices that may act as the output device 1305 include, but are not limited to, lights 1305A, speakers, haptic feedback devices 1305B, or any combination thereof. In one preferred embodiment, the fob 1300 may emit different beeping sounds via a speaker depending on whether the audio data was received by the system 100 and understood to contain catch log data, received but not understood to contain catch log data, or not received at all by the system 100. In another preferred embodiment, a haptic feedback device 1305B may cause the fob 1300 to vibrate in different ways depending on whether the audio data was received by the system 100 and understood to contain catch log data, received but not understood to contain catch log data, or not received at all by the system 100. In yet another preferred embodiment, a light 1305A of the fob 1300 may indicate whether the audio data was received by the system 100 and understood to contain catch log data, received but not understood to contain catch log data, or not received at all by the system 100 by blinking a certain number of times or emitting different colors.

As mention previously, some embodiments of the system 100 may further comprise a user interface 111. A user interface 111 may be defined as a space where interactions between a user 105 and the system 100 may take place. In an embodiment, the interactions may take place in a way such that a user 105 may control the operations of the system 100. A user interface 111 may include, but is not limited to operating systems, command line user interfaces, conversational interfaces, web-based user interfaces, zooming user interfaces, touch screens, task-based user interfaces, touch user interfaces, text-based user interfaces, intelligent user interfaces, and graphical user interfaces, or any combination thereof. The system 100 may present data of the user interface 111 to the user 105 via a display operably connected to the processor 115. A display may be defined as an output device that communicates data that may include, but is not limited to, visual, auditory, cutaneous, kinesthetic, olfactory, and gustatory, or any combination thereof.

Information presented via a display may be referred to as a soft copy of the information because the information exists electronically and is presented for a temporary period of time. Information stored on the non-transitory computer-readable medium 116 may be referred to as the hard copy of the information. For instance, a display may present a soft copy of visual information via a liquid crystal display (LCD), wherein the hardcopy of the visual information is stored on a local hard drive. For instance, a display may present a soft copy of audio information via a speaker, wherein the hard copy of the audio information is stored on a flash drive. For instance, a display may present a soft copy of tactile information via a haptic suit, wherein the hard copy of the tactile information is stored within a database 130. Displays may include, but are not limited to, cathode ray tube monitors, LCD monitors, light emitting diode (LED) monitors, gas plasma monitors, screen readers, speech synthesizers, haptic suits, speakers, and scent generating devices, or any combination thereof.

In another embodiment, the computing device 110 may be used to input catch log data for the creation of a catch log profile 140. As shown in FIG. 1, catch log data may include various types information related to fishing. Types of information that may be included in a catch log profile 140 as catch log data may include, but is not limited to, equipment, taxonomic rank, length, weight, and geolocation, or any combination thereof. The type of catch log data input via the user interface 111 may depend on the rules and regulations 135 for the geolocation in which the fauna was caught. For instance, a Red Fish caught in Alabama may have catch log data that includes, but is not limited to, length of the Red Fish and digital images 205 or videos of the Red Fish. Catch log data may be uploaded and/or input into the database 130 via the user interface 111 automatically or manually by the user 105. In an embodiment, catch log data may be automatically uploaded and stored in the database 130. For instance, a digital image 205 of marine life uploaded by a user 105 when the marine life is caught may be automatically stored within a database 135. In an embodiment, when a digital image 205 is received by the processor 115, the processor 115 may also receive other catch log data from the system 100. For instance, the system 100 may receive time data 140E and geospatial data 140B from a time keeping device and a GPS 122 when a digital image 205 is received by the processor 115. Once the catch log profile 140 has been created, the processor 115 may save the catch log profile 140 to the non-transitory computer-readable medium 116. In an embodiment, a plurality of catch log profiles 140 may be stored within the non-transitory computer-readable medium 116 of the system 100. Alternatively, the system 100 may store the plurality of catch log profiles 140 within a database 130, wherein each catch log profile 140 within the plurality of catch log profiles 140 may contain information specific to a particular taxonomic rank of fauna caught in a particular geolocation.

In a preferred embodiment, the system 100 may save a launch geolocation and a catch geolocation to a catch log profile 140. A launch geolocation may be defined as the geolocation in which a user 105 begins participating in a wildlife sport. A catch geolocation may be defined as a geolocation in which a user 105 catches fauna. The system 100 may use the launch geolocation and catch geolocation to create a registration strategy. A registration strategy may be defined as a strategy for registering caught fauna in a way that would not a be a violation of rules and regulations relevant to a particular geolocation. The system 100 may update the registration strategy as new data becomes available. This data includes, but is not limited to, equipment, taxonomic rank, length, weight, and geolocation, or any combination thereof. For instance, the system 100 may update the registration strategy as the user 105 fishes in a geolocation having different relevant rules and regulations than prior geolocations.

As used herein, a database 130 refers to a set of related data and the way it is organized. Access to this data is usually provided by a database management system (DBMS) consisting of an integrated set of computer software that allows users 105 to interact with one or more databases 130 and provides access to all of the data contained within the database 130. The DBMS provides various functions that allow entry, storage and retrieval of large quantities of information and provides ways to manage how that information is organized. Because of the close relationship between the database 130 and the DBMS, as used herein, the term database 130 may refer to both a database and DBMS. As shown in FIG. 1, the database 130 is configured to store data relating to fishing/hunting therein. The processor 115 may be operably connected to the database 130 via wired or wireless connection. The database 130 may be a relational database such that the geospatial data 140B, fauna data 140A, equipment data 140F, weight data 140D, and length data 140C associated with each catch log profile 140 within the plurality of catch log profiles 140 may be stored, at least in part, in one or more tables. Alternatively, the database 130 may be an object database such that he geospatial data 140B, fauna data 140A, equipment data 140F, weight data, and length data 140C associated with each catch log profile 140 within the plurality of catch log profiles 140 are stored, at least in part, as objects. In some instances, the database 130 may comprise a relational and/or object database and a server 125 dedicated solely to managing the content assigned to catch log profiles 140 in the manner disclosed herein.

As mentioned previously, the system 100 may further comprise a server 125. A server 125 may be a search server, a document indexing server, and general web server. Servers 125 may be separate entities performing different functions or similar functions. For instance, two or more servers 125 may be implemented to work as a single server 125 performing the same tasks. Alternatively, one server 125 may perform the functions of multiple servers 125. For instance, a single server 125 may perform the tasks of a web server and an indexing server. Although represented as a single server 125 in FIG. 1, it is understood that multiple servers 125 may be used to operably connect the processor 115 to the database 130 and/or the content repositories. The processor 115 may be operably connected to the server 125 via wired or wireless connection. Search servers may include one or more computing devices 110 designed to implement a search engine, such as a documents/records search engine, general webpage search engine, etc. Search servers may, for example, may include one or more web servers to receive search queries and/or inputs from users 105, search one or more databases 130 in response to the search queries and/or inputs, and provide documents or information, relevant to the search queries and/or inputs, to users 105. In some implementations, search servers may include a web search server that may provide webpages to users 105, where a provided webpage may include a reference to a web server at which the desired information and/or links is located. The references, to the web server at which the desired information is located, may be included in a frame and/or text box, or as a link to the desired information/document.

Document indexing servers may include one or more computing devices 110 designed to index documents available through networks. Document indexing servers may access other servers 125, such as web servers that host content, to index the content. In some implementations, document indexing servers may index documents/records stored by other servers 125 connected to the network. Document indexing servers may, for example, store and index content, information, and documents relating to user 105 accounts and user-generated content. Web servers may include servers 125 that provide webpages to clients. For instance, the webpages may be HTML-based webpages. A web server may host one or more websites. A website, as the term is used herein, may refer to a collection of related webpages. Frequently, a website may be associated with a single domain name, although some websites may potentially encompass more than one domain name. The concepts described herein may be applied on a per-website basis.

Alternatively, in some implementations, the concepts described herein may be applied on a per-webpage basis.

The GPS 122 is configured to transmit geospatial data 140B to the processor 115 in a way that allows the system 100 to determine the geolocation of the user 105, which in turn allows the system 100 to determine any relevant rules and regulations 135 applicable to the user 105. Alternatively, a user 105 may manually input geospatial data 140B corresponding to a specific geolocation into the user interface 111 of the system 100. For instance, a system 100 comprising a computing device 110 having a user interface 111 may allow a user 105 to input geospatial data 140B using an input device such as a keyboard. For instance, a system 100 comprising a computing device 110 having a touch screen and a user interface 111 comprising a graphic information system (GIS) may allow a user 105 to select the geolocation on a map displayed via the touchscreen. As used herein, geospatial data 140B may be spatial data including, but not limited to, numeric data, vector data, and raster data, or any combination thereof. Numeric data may be statistical data which includes a geographical component or field that can be joined with vector files so the data may be queried and displayed as a layer on a map in a GIS. Vector data may be data that has a spatial component, or X, Y coordinates assigned to it. Vector data may contain sets of points, lines, or polygons that are referenced in a geographic space. Raster data may be data in a .JPG, .TIF, .GIF or other picture file format. For instance, a map scanned in a flatbed scanner may be considered raster data.

In an embodiment, the system 100 may determine the taxonomic rank of fauna from a digital image 205 taken by a user 105. For instance, a user 105 participating in a deep-sea fishing charter trip may take a picture of a caught sailfish using a smart device, and the system 100 may automatically determine that the taxonomic rank of the marine life is a sailfish via digital signal processing. For instance, a user 105 participating in a duck hunting trip may take a picture of a bagged wood duck using a smart device, and the system 100 may automatically determine that the taxonomic rank of the wildlife is a wood duck via digital signal processing. In an embodiment, the system 100 may use a machine learning technique to determine a taxonomic rank of fauna within a digital image 205. For instance, pattern recognition or feature extraction may be used to determine that the taxonomic rank of fauna within a digital image 205 is a bonefish. For instance, pattern recognition or feature extraction may be used to determine that the taxonomic rank of fauna within a digital image 205 is a whitetail deer. Pattern recognition methods may use labeled data that the system 100 may match to a digital image 205 using algorithms to determine a taxonomic rank of fauna. Feature extraction methods may use algorithms to detect and isolate various desired portions or shapes of a digital image 205 to determine a taxonomic rank of fauna. Alternatively, the system 100 may use more than one machine learning technique to determine a taxonomic rank of fauna from a digital image 205. For instance, if the system 100 fails to determine a taxonomic rank of fauna using pattern recognition, the system 100 may subsequently attempt to determine a taxonomic rank of fauna using feature extraction.

The system 100 may compare data from the captured digital image 205 relating to the general shape of the fauna, the color of the fauna, and/or markings on the fauna, such as spots or stripes in various locations on the body of the fauna. When the taxonomic rank is detected by the system 100, the system 100 may automatically transmit the information to a catch log profile 140. However, because some taxonomic ranks, particularly those of closely related species, may have a very similar physical appearance, the system 100 may provide the user 105 with a limited number of taxonomic rank options to choose from based on a comparison of the digital image 205 with taxonomic data in the database 130. In addition, the options of taxonomic rank to choose may also be limited based on geospatial data 140B and habitat range data associated with identified taxonomic rank contained within the database 130. However, a user 105 may override the provided taxonomic rank list to choose from any taxonomic rank contained within the database 130. Thus, the user 105 may optionally select a different taxonomic rank than an automatically detected taxonomic rank, and this information may then be associated with a digital image 205 of fauna or other fauna data 140A. In an embodiment, the user 105 may optionally skip the step of capturing a digital image 205 of the fauna and simply manually select the taxonomic rank from a list as previously described. Alternatively, the user 105 may choose to skip the step of analyzing the digital image 205 for a taxonomic rank of fauna and simply select the taxonomic rank from the list as previously described.

In addition, the system 100 may be programmed to automatically detect the length/size of fauna within a digital image 205. For instance, the user interface 111 may comprise of an application that allows for the capture of digital images 205. The digital image 205 capturing application of the user interface 111 may comprise a built-in digital measurement ruler having labeled length markings at defined intervals that may be used to measure the length fauna within a digital image 205. In an embodiment, the user 105 may hold the computing device 110 having a camera 113 may be used to make the digital image 205 at a specified distance from the fauna before the digital image 205 is taken. For instance, the camera 113 may be held approximately two meters away from the fauna in order to get a length determination by the system 100. By taking the digital image 205 at the specified distance, the system 100 may use the measurement ruler as a point of reference in which to estimate the length of the fauna within the digital image 205. In an embodiment, the user 105 may choose to make the digital measurement ruler visible or not visible within the user interface 111. Alternatively, the system 100 may determine the length of the fauna by determining the shape and size of the fauna in the digital image 205 and performing a relative size analysis to determine the length of the fauna. During a relative size analysis, the system 100 may compare the size and shape of the fauna taken at a specific distance to that of the size and shape of an object taken at the same specific distance and having a known size. The system 100 may then determine the size of the fauna within the digital image 205 by using the object with a known size as a point of reference.

In yet another embodiment, the system 100 may further comprise at least one equipment sensor. The at least one equipment sensor may be configured to detect fishing/hunting equipment having an equipment transmitter and transmit equipment data 140F to the processor 115. The equipment transmitter is preferably embedded in the marine/hunting equipment and configured to broadcast a signal containing information relevant to that particular piece of marine/hunting equipment due to the user's 105 geolocation. In an embodiment, the equipment sensor may automatically transmit equipment data 140F received from an equipment transmitter to the processor 115, which may subsequently be transferred to a catch log profile 140. In another embodiment, the user 105 may bring a piece of marine/hunting equipment having an equipment transmitter into close proximity with a computing device 110 having an equipment sensor in a way such that he computing device 110 will recognize that the user 105 is currently using that particular piece of marine/hunting equipment. For instance, a user 105 may bring a lure fitted with a near field communication (NFC) transmitter into close proximity with a mobile device having an NFC sensor. The NFC sensor will alert a user interface 111 of the mobile device that the user 105 is currently using that particular lure. If a catch log profile 140 is created while the user interface 111 associates the user 105 with that particular lure, the equipment data 140F of the associated lure may be automatically added to the newly created catch log profile 140. The system 100 may associate this particular piece of marine equipment with the user 105 until the user 105 selects to dissociate the marine equipment from themselves via a function of the user interface 111 or the system 100 is used to tag a new piece of marine equipment that may replace the previous marine equipment. Alternatively, a user 105 may input equipment data 140F manually into a catch log profile 140. For instance, a user 105 may input lure type, reel type, rod type, and line type where directed by the user interface 111 using an input device, including, but not limited to, a keyboard or a touchscreen.

As mentioned previously, the system 100 may comprise a power supply. The power supply may be any source of power that provides the system 100 with electricity. In one preferred embodiment, the system 100 may comprise of multiple power supplies that may provide power to the system 100 in different circumstances. For instance, the system 100 may be directly plugged into a stationary power outlet, which may provide power to the system 100 so long as it remains in one place. However, the system 100 may also be connected to a battery so that the system 100 may receive power even when the it is not connected to a stationary power outlet. In this way, the system 100 may always receive power so that it may continuously update catch log profiles 140 and provide users 105 with a rules and regulations 135 relevant to the geolocation in which the fauna was caught.

As illustrated in FIG. 3, the system 100 may also comprise a plurality of permission levels 300 that may allow a user 105 to limit what data within their catch log profiles 140 they share with other users 105. This data may be collectively known as content 315, 335, 355. To access the content 315, 335, 355 stored within the database, users 105 may be required to make a request via a user interface 111. Access to the content 315, 335, 355 within the database 130 may be granted or denied by the processor 115 based on verification of a requesting user's 305, 325, 345 permission level 300. If the requesting user's 305, 325, 345 permission level 300 is sufficient, the processor 115 may provide the requesting user 305, 325, 345 access to content 315, 335, 355 stored within the database 130. Conversely, if the requesting user's 305, 325, 345 permission level 300 is insufficient, the processor 115 may deny the requesting user 305, 325, 345 access to content 315, 335, 355 stored within the database 130. In an embodiment, permission levels 300 may be based on user roles 310, 330, 350 and administrator roles 170, as shown in FIG. 3. User roles 310, 330, 350 allow requesting users 305, 325, 345 to access content 315, 335, 355 that a user 105 has uploaded and/or otherwise obtained through use of the system 100. User roles 310, 330, 350 allow users 105 (or requesting users 305, 325, 345 authorized by the user 105) to access the user data tied to their own catch log profiles 140 within the database 130. Administrator roles 370 allow administrators 365 to access system wide data.

In another embodiment, catch log profiles 140 may be assigned to a user 105 in a way such that a user 105 may access such content 315, 335, 355 via a user interface 111. In an embodiment, the system 100 may be configured to send a user 105 a notification indicating that another user 105 has shared information with the user 105. To access the data within a user's 105 catch log profiles 140, a user 105 may make a user request via the user interface 111 to the processor 115. In an embodiment, the processor 115 may grant or deny the request based on the permission level 300 associated with the requesting user 305, 325, 345. Only users 105 having appropriate user roles 310, 330, 350 or administrator roles 370 may access the data associated with a user's 105 profile. For instance, as illustrated in FIG. 3, data within catch log profiles 140 assigned to requesting user 2's 325 content 335 may be selectively shared with requesting user 1 305 by granting requesting user 1 305 access to all of requesting user 2's 325 content 335. Alternatively, requesting user 2 325 may restrict access to their content 335 in a way such that requesting user 1 305 may only access certain types of data within requesting user 2's 325 content 335. For instance. Requesting user 2 325 may grant requesting user 1 305 access to catch log profiles 140 having certain information but may restrict access to catch log profiles 140 not having that information. In this instance, requesting user 1 305 may view requesting user 2's 325 catch log profiles 140 containing a particular type of information but may not view catch log profiles 140 not containing that information. For instance, a user 105 may selectively allow a requesting user 305, 325, 345 to view catch log profiles 140 that were recorded on a particular date but not allow a requesting user 305, 325, 345 to view catch log profiles 140 recorded on a different date. For instance, a user 105 may selectively allow a requesting user 305, 325, 345 to view catch log profiles 140 containing information about a specific taxonomic rank of fauna but may deny requesting users 305, 325, 345 access to catch log profiles 140 not containing information regarding that particular taxonomic rank of fauna. This information may include digital images 205 of the fauna or may include other associated data, including the geolocation where the fauna was caught and/or the wildlife sports equipment on which the fauna was caught.

In another embodiment, a security system 120 may be operably connected to the processor 115, wherein the security system 120 may transmit a computer readable signal to alert a user 105. A computer readable signal used to alert a user of an event is preferably an alarm signal. In one embodiment, the alarm signal may cause the processor 115 to cause the system 100 to perform a particular function, such as display an indicia, emit a noise, flash a light, etc. In an embodiment, the security system 120 may transmit an alarm signal when the system detects the user 105 is in danger of violating any rules and regulations 135 relevant to the geolocation in which the fauna was caught. For instance, the security system 120 may alert a user 105 via an audible noise to submit a required Red Snapper reporting form before removing the marine vehicle from the water when the security system 120 senses that the marine vehicle is being removed from the water. For instance, the alarm system may alert a user 105 via text message when geospatial data 140B received by the system indicates that the user 105 has moved from the waters of one state's jurisdiction to another's or when a user 105 has moved between state and federally regulated waters. For instance, the security system 120 may alert a user 105 via an audible noise when the bag limit of turkey in a particular geolocation has been reached.

In one preferred embodiment, the system may alert the user 105 that a rule or regulation 135 is in danger of being be violated via the fob after extracting catch log data from audio data. Once the catch log data has been extracted by the system 100 and added to a catch log profile 140, the processor 115 may compare the catch log data to rules and regulations 135 to determine whether or not a user 105 is in danger of violating a rule or regulation 135. The processor 115 may send an alarm signal to the control board 1310 of the fob 1300 via wireless communication devices. In some preferred embodiments, the fob 1300 may receive a computer readable signal, indicating whether or not the catch log data was successfully extracted from the audio data, as well as the alarm signal. So, in some embodiments of the system 100, the control board 1310 may cause the output device 1305 of the fob 1300 to both indicate to a user 105 the status of any catch log data contained within the audio data as well as to whether or not any rules and regulations 135 are potentially being violated. In a preferred embodiment, a red light of the fob 1300 may indicate to the user 105 that a rule or regulation 135 is about to be violated. In another preferred embodiment, a noise emitted by a speaker may indicate to a user 105 that a rule or regulation 135 is about to be violated.

In another embodiment, the security system 120 may be a standard alarm system. A standard alarm system may be defined as system configured to detect sudden changes in a vehicle's normal environment and alert a user 105 of said changes. The standard alarm system may be connected to the system 100 in a way such that when a change in a vehicle's normal environment is detected, an alarm signal may be transmitted by the processor 115 to a user 105 in order to alert said user 105 of a potential trespass to the user's 105 property. For instance, a standard alarm system configured to detect vibrations may alert a user 105 via an alarm signal of a trespass to the user's 105 property when footsteps are detected while a user 105 is not present. For instance, a standard alarm system configured to detect changes in a quantity of light may alert a user 105 of a potential trespass when sudden changes in the amount of ambient light is indicative of a flashlight about the user's 105 property when the user 105 is not present. For instance, a standard alarm system configured to detect changes in elevation may alert a user 105 when the barometric pressure suddenly changes, indicating a marine vehicle is being taken out of the water via a trailer when the user 105 is not present. The alarm systems described herein may use information obtained from sensors of the system 100 to determine whether or not to alert a user 105.

In another embodiment, the security system may comprise an indoor positioning system (IPS). An IPS may be configured to locate the fob 1300 using radio waves, magnetic fields, acoustic signals, or other sensory information. In one embodiment, the IPS may use trilateration and triangulation methods to determine if the fob 1300 is located within range. An IPS may determine the fob's 1300 position using, but not limited to, anchor nodes, magnetic positioning, and dead reckoning, or any combination thereof. Anchor nodes are devices having positions known to the system 100. In an embodiment, a wireless communication device may act as an anchor node. A fob 1300 may be connected to the IPS in a way such that the system 100 may monitor the location of the fob 1300 when in range. If the IPS determines that the fob 1300 is in range, the IPS may cause the alarm system to be disabled. In one preferred embodiment, the system 100 may capture identifying addresses from the fob 1300, which may allow the system 100 to recognize the fob 1300. An identifying address may be, but is not limited to, basic service set identifier (BSSID), extended service set identifier (ESSID), service set identifier (SSID), and media access control (MAC) address, or any combination thereof.

In another preferred embodiment, the system 100 may be configured in a way such that should the fob 1300 fall outside a given range of an anchor node, the processor 115 may send a signal that shuts off the engine of a vehicle and/or sends out a computer readable signal that may be used to alert other users 105 of the system 100. For instance, should a user 105 of the system 100 in possession of a fob 1300 fall off a marine vehicle while the marine vehicle is in motion, the system 100 would automatically shut off the engine of the marine vehicle as soon as the fob 1300 in the user's 105 possession was a certain distance away from a certain anchor node of the system 100. The system 100 may also send a computer readable signal to emergency personnel to alert them that there has potentially been an accident where a user 105 has lost control of their marine vehicle and needs assistance. The system 100 may send geolocation data to emergency personnel to assist in any attempt to help the potentially distressed user 105. The system 100 preferably doesn't prevent the engine of a vehicle from being restarted once sending a computer readable signal to turn off said engine. For instance, the system 100 may allow someone else on the marine vehicle to restart the engine so that they may retrieve the user 105 after the system 100 sent a computer readable signal that stopped said engine. However, some embodiments of the system 100 may be configured such that the engine may only be started when a user 105 having a fob 1300 is within range of a certain anchor node on the system 100.

Figure 4:
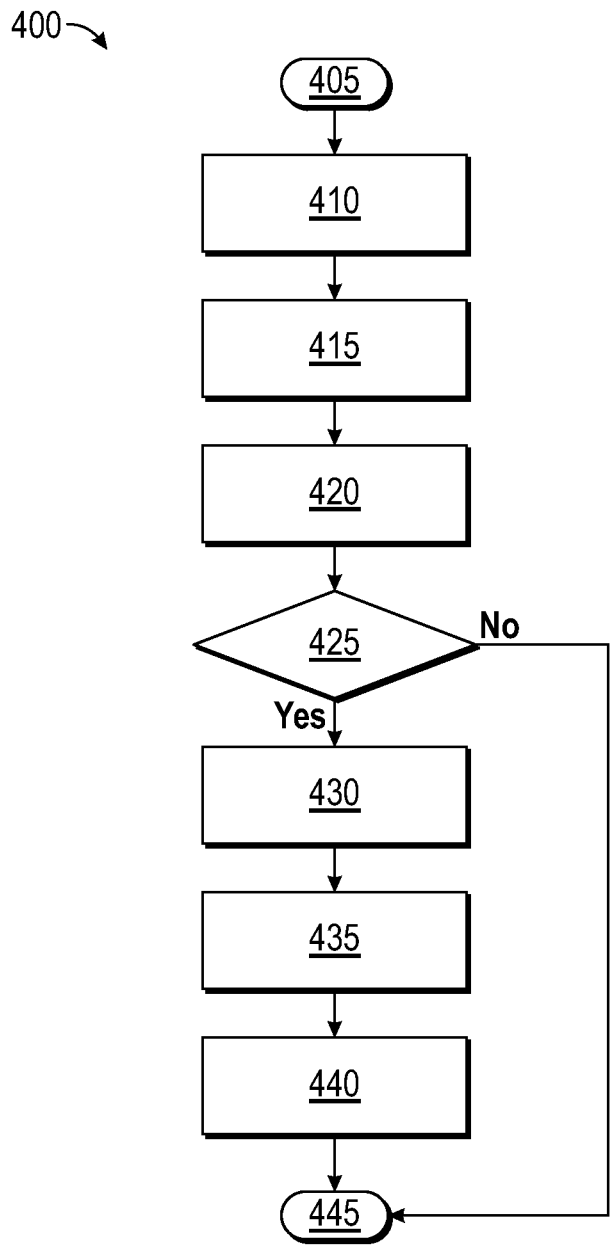
FIG. 4 is a flow chart illustrating certain method steps of a method embodying features consistent with the principles of the present disclosure.

FIG. 4 provides a flow chart 400 illustrating certain, preferred method steps that may be used to carry out the method for determining rules and regulations 135 relevant to the geolocation in which the fauna was caught and displaying them to the user 105. Step 405 indicates the beginning of the method. During step 410, the processor 115 may acquire geospatial data 140B from the system 100. The processor 115 may then determine the geolocation using the geospatial data 140B in step 415. In an embodiment, geospatial data 140B is obtained using a GPS 122, but other methods may be used to determine a user's 105 geolocation without departing from the inventive subject matter as described herein. For instance, a user 105 may select a geolocation within a GIS of a user interface 111. Once a geolocation has been determined, the processor 115 may perform a query for rules and regulations 135 using the geolocation data during step 420. In a preferred embodiment, the processor may query the non-transitory computer-readable medium 116 and/or database 130 for rules and regulations 135 relevant to the geolocation in which the fauna was caught. During step 425, the processor 115 may determine how to proceed based on the outcome of the query. If relevant rules and regulations 135 are not found for a particular geolocation, the system 100 may proceed to the terminate method step 445. If relevant rules and regulations 135 are found for a particular geolocation, the system 100 may proceed to step 430. During step 430, the processor 115 may receive the rules and regulations 135 relevant to the geolocation in which the fauna was caught. Once received, the processor 115 may list the relevant rules and regulations 135 within the user interface 111 in a way such that they may be displayed to a user 105 during step 435. The processor 115 may then proceed to step 440 and transmit the rules and regulations 135 within the user interface 111 to a display so that the relevant rules and regulations 135 may be viewed by the user 105. The method may proceed to the termination step 445 after the relevant rules and regulations 135 have been displayed within the user interface 111 via the display.

Figure 5:
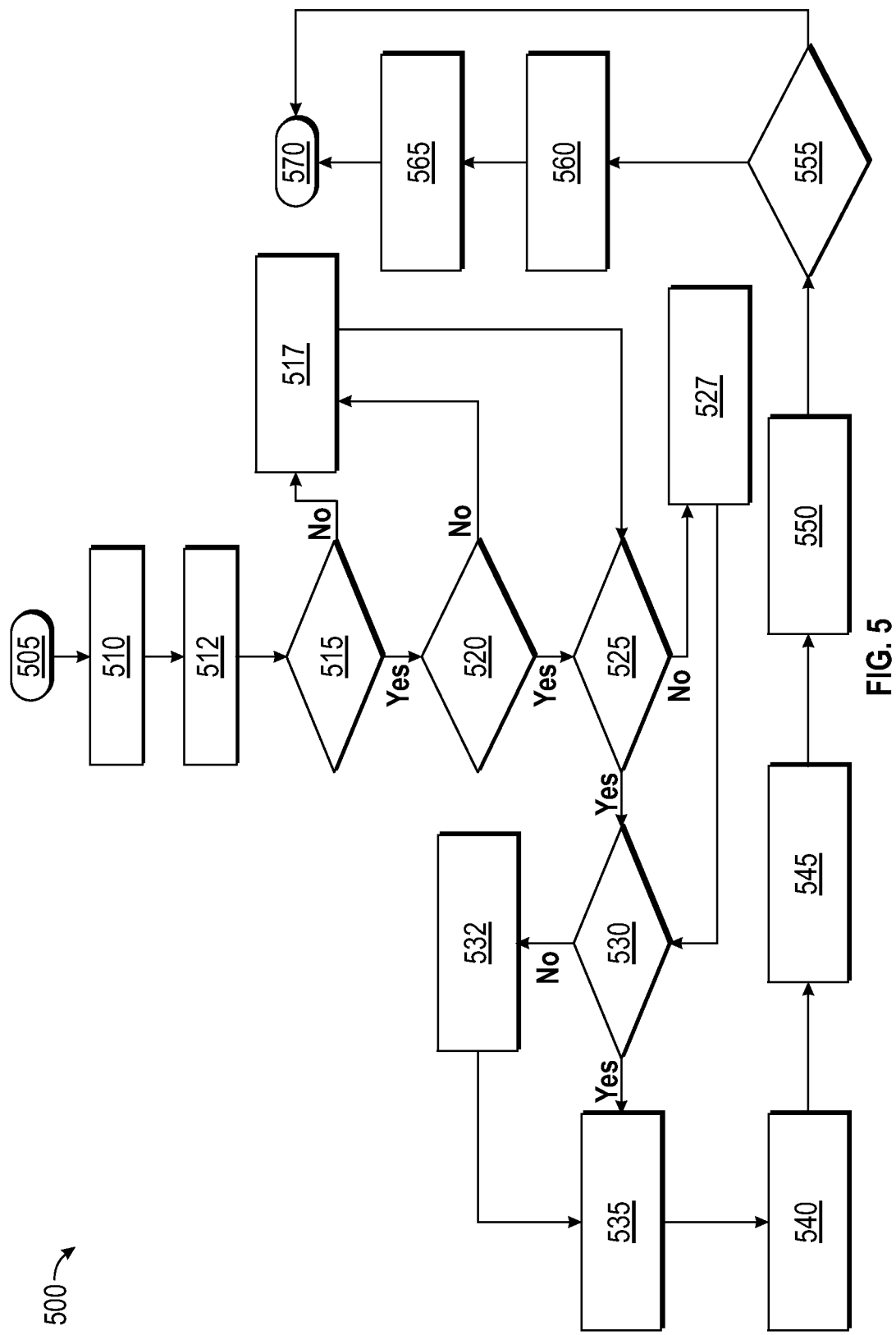
FIG. 5 is a flow chart illustrating certain method steps of a method embodying features consistent with the principles of the present disclosure.

FIG. 5 provides a flow chart 500 illustrating certain, preferred method steps that may be used to carry out the method for creating a catch log profile 140 using a digital image 205 and displaying relevant rules and regulations 135 to a user 105 based on the taxonomic data of fauna within the digital image 205. Step 505 indicates the beginning of the method. During step 510, the processor 115 may receive a digital image 205 of fauna from the computing device 110. After receiving the digital image 205, the processor 115 may perform an analysis to determine if a taxonomic rank of fauna is present within the digital image 205 in step 512. In a preferred embodiment, the system 100 may use a machine learning technique to determine the taxonomic rank of fauna within the digital image 205. During step 515, the processor may determine how to proceed based on the results of the analysis. If the system 100 cannot determine the taxonomic rank of fauna, the method may proceed to step 517, wherein the user may select taxonomic rank of fauna from a list. If the system 100 is able to determine taxonomic rank of fauna within the digital image 205, the method may proceed to step 520. In one alternative embodiment, the user 105 may optionally skip the step of capturing a digital image 205 of fauna and select taxonomic rank of fauna from a list. In yet another alternative embodiment, once a taxonomic rank of fauna has been determined by the system 100 or selected from a list by the user 105, the system 100 may proceed directly to step 535, wherein the processor 115 may create a catch log profile 140 and transmit the fauna data 140A, length data 140C, and/or weight data 140D to the catch log profile 140 before saving the catch log profile 140 to the non-transitory computer-readable medium 116 and/or database 130.

In a preferred embodiment, as illustrated in FIG. 5, the system 100 may determine the length of fauna in step 520. For instance, the system 100 may use a machine learning technique to determine the length of the fauna within the digital image 205. Alternatively, the user 105 may optionally skip the step of having the system 100 determine the length of the fauna and manually input the length during step 527. Once the system 100 has established the length of the fauna within the digital image 205, the system 100 may determine the weight of a taxonomic rank within a digital image 205 as shown in step 530. In one preferred embodiment, the system 100 may use a scale to determine the weight of the fauna within the digital image 205. Preferably, the scale is configured in a way such that it may transmit the weight data 140D to the processor 115. In one alternative embodiment, the user 105 may optionally skip the step of having the system 100 determine the weight of the fauna and manually input the weight into the user interface 111 during step 532. Once the system 100 has established the taxonomic rank, length, and weight of the fauna within the digital image 205, the system 100 may proceed to step 535, wherein the processor 115 may create a catch log profile 140 and transmit the fauna data 140A, length data 140C, and weight data 140D to said catch log profile 140. The system 100 may then save the catch log profile 140 within the non-transitory computer-readable medium 116 and/or database 130.

Once the taxonomic data of fauna within the digital image 205 and any other data has been transmitted to the catch log profile 140, the processor 115 may find all relevant rules and regulations 135 for the taxonomic data of fauna by querying the non-transitory computer-readable medium 116 and/or database 130 during step 545. To find relevant rules and regulations 135, the system 100 must determine a user's 105 geolocation in step 540. In a preferred embodiment, the system 100 may determine a user's 105 geolocation using geospatial data 140B obtained via a GPS 122. In another embodiment, the user 105 may select a geolocation on their computing device 510 using a GIS of a user interface 111 of the system 100. Once the rules and regulations 135 pertinent to the geolocation have been determined, the processor 115 may perform a query to determine which rules and regulations 135 are relevant to the user 105 based on the taxonomic data of fauna, length data 140C, and weight data 140D within the catch log profile 140 during step 550. For instance, the processor 115 may find rules and regulations 135 regarding Red Fish when determining relevant rules and regulations 135 for a user 105 having a catch log profile 140 containing fauna data 140A regarding Red Fish.

During step 555, the system 100 may determine how to proceed based on the results of the query. If the processor 115 determines that there are no relevant rules and regulations 135 requiring the user 105 to report catch results before exiting the water/hunting area, the method may proceed to the terminate method step 570. If the processor 115 determines that there are relevant rules and regulations 135 based on the fauna data 140A, length data 140C, and weight data 140D, the method may proceed to step 560. During step 560, the processor 115 may receive the rules and regulations 135 relevant to a particular geolocation. Once received, the processor 115 may list the relevant rules and regulations 135 within the user interface 111 in a way such that they may be displayed to a user 105. The processor 115 may then transmit the rules and regulations 135 within the user interface 111 to a display so that they may be viewed by the user 105 during step 565. The method may proceed to the termination step 570 after the relevant rules and regulations 135 have been displayed within the user interface 111 via a display.

Figure 6:
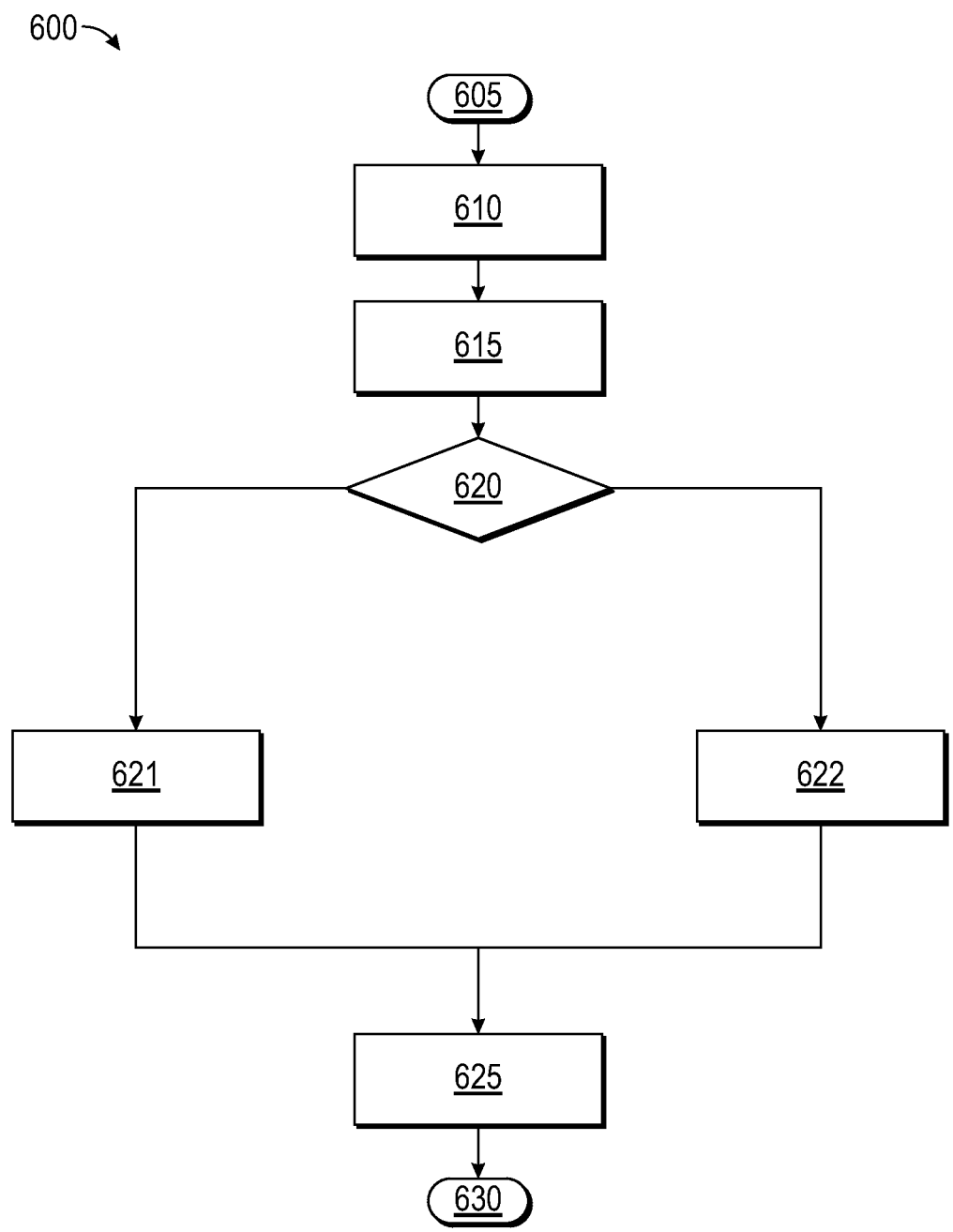
FIG. 6 is a flow chart illustrating certain method steps of a method embodying features consistent with the principles of the present disclosure.

FIG. 6 provides a flow chart 600 illustrating certain, preferred method steps that may be used to carry out the method for alerting a user 105 via indicia, indicating whether or not they are in violation of any rules and regulations 135 relevant to the geolocation in which the fauna was caught. Step 605 indicates the beginning of the method. During step 610, the processor 115 may create a catch log profile 140 using the methods described herein, wherein the catch log profile 140 contains rules and regulations 135 relevant to the geolocation in which the fauna was caught as well as the fauna data 140A and other data that may be accumulated within the catch log profile 140 by the system 100. Once the catch log profile 140 has been created, the processor 115 may proceed to the perform analysis step 615. During step 615, the processor 115 is configured to compare the data of the catch log profile 140 with the rules and regulations 135 to determine whether a user 105 is violating any of the rules and regulations 135. Based on the foregoing comparison, the processor 115 may display indicia for each of the rules and regulations 135 listed within the user interface 111. For instance, the processor 115 may instruct the user interface to display the "within limits" indicia. If catch log data within the catch log profile 140 is assigned the "within limits" indicia, this may indicate to the user 105 that she has not violated one of the listed rules and regulations 135 relevant to the geolocation in which the fauna was caught. In an embodiment, the within "limits indicia" may be assigned by the processor 115 when fauna caught is not a fauna forbidden to be kept by a user 105 via the rules and regulations 135. In an embodiment, the "within limits" indicia may be assigned by the processor 115 when the taxonomic data of fauna caught is of an appropriate length or weight as outlined in the relevant rules and regulations 135. In an embodiment, the "within limits" indicia may be assigned by the processor 115 when the catch limit of a particular fauna caught and kept by the user 105 has not exceeded the maximum limit as described by the rules and regulations 135 relevant to the geolocation in which the fauna was caught. For instance, the system 100 may assign the "within limits" indicia when a fisherman catches a third Redfish in a geolocation having rules and regulations that allow fisherman to keep at least three redfish.

For instance, the processor 115 may display the "outside of limits" indicia. If catch log data within the catch log profile 140 is assigned an "outside of limits" indicia, this may indicate to the user 105 that she has violated rules and regulations 135 relevant to the geolocation in which the fauna was caught. For instance, the "outside of limits" indicia may be assigned by the processor 115 when the fauna caught is a fauna forbidden to be kept by a user 105 as outlined by the relevant rules and regulations 135. For instance, the "outside of limits" indicia may be assigned by the processor 115 when the fauna caught is not of an appropriate length or weight as outlined by the relevant rules and regulations 135. For instance, the "outside of limits" indicia may be assigned by the processor 115 when the catch limit of a particular fauna caught and kept by the user 105 has exceeded the maximum limit as described by the rules and regulations 135 relevant to the geolocation in which the fauna was caught.

Indicia may be displayed in the user interface 111 as, but are not limited to, text, highlights, checks, X's, strikethroughs, symbols, images, or any other suitable indicator that may indicate to a user 105 that they have or have not violated rules and regulations 135 of the geolocation in which the fauna was caught. The processor 115 may determine how to proceed based on the analysis performed by the processor 115 during step 620. In an embodiment, if the processor 115 determines that the "within limits" indicia should be assigned, the processor 115 may proceed to step 621, wherein the processor 115 may assign the "within limits" indicia to the relevant data within the catch log profile 140. In an embodiment, if the processor 115 determines that the "outside of limits" indicia should be assigned, the processor 115 may proceed to step 622, wherein the processor 115 may assign the "outside of limits" indicia to the relevant data within the catch log profile 140. Once the processor 115 has assigned appropriate indicia to the data within the catch log profile 140, the processor 115 may present the indicia to the user 105 via a display in step 625. The method may proceed to the terminate method step 630 after the indicia have been presented.

Figure 7:
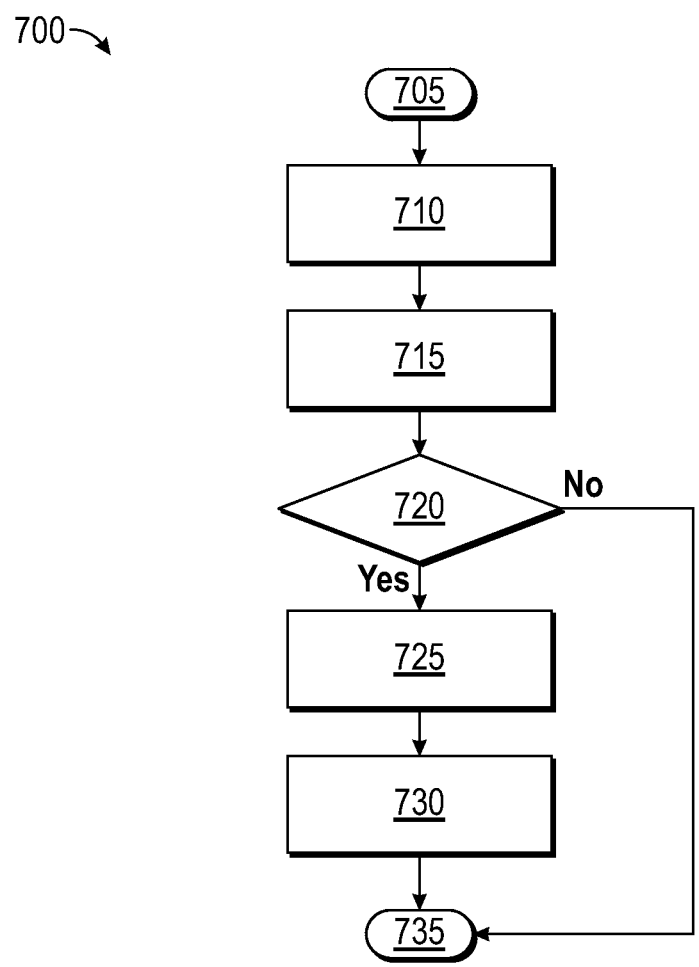
FIG. 7 is a flow chart illustrating certain method steps of a method embodying features consistent with the principles of the present disclosure.

FIG. 7 provides a flow chart 700 illustrating certain, preferred method steps that may be used to carry out the method for alerting a user 105 via a computer-readable signal, indicating whether or not the user 105 is in violation of any rules and regulations 135 relevant to the geolocation in which fauna was caught. Step 705 indicates the beginning of the method. During step 710, the processor 115 may create a catch log profile 140 in the manners as described herein, wherein the catch log profile 140 contains rules and regulations 135 relevant to the user's geolocation as well as fauna data 140A and other data that may be accumulated within the catch log profile 140 by the system 100. Once the catch log profile 140 has been created, the user 105 may proceed to the perform query step 715. In step 720, the system 100 may determine how to proceed based on the results of the query. If the processor 115 determines there are no relevant rules and regulations 135 requiring the user 105 to report catch results before exiting the water, the method may proceed to the terminate method step 735. If the processor 115 determines there are relevant rules and regulations 135 requiring the user 105 to report catch results before exiting the water, the processor 115 may proceed to step 725.

During step 725, the processor 115 may be configured to determine whether or not the user 105 is removing their marine vehicle from the water before the user 105 has submitted catch results to an authority in a geolocation in which doing so would be a violation of rules and regulations 135. In a preferred embodiment, the system 100 may receive information from the security system 120 to determine whether or not the marine vehicle is being removed from the water. Once the system 100 determines that the marine vehicle is being removed from the water, the processor 115 may transmit a computer-readable signal to the computing device 110 of the user 105 during step 730, which may alert the user 105 that they may be in violation of the relevant rules and regulations 135. In another preferred embodiment, the system 100 may continuously check the geolocation of the marine vehicle and alert the user 105 to submit catch results when they are within a certain specified distance of the shoreline. Geolocation data may be collected from a GPS 122 of the security system or any other GPS 122 operably connected to the system 100. For instance, the system 100 may alert the user 105 to submit catch results when the system 100 determines that a user 105 is within one tenth of a mile from the shoreline based on geospatial data 140B collected from a user's 105 mobile computing device having a GPS 122 and being operably connected to the system 100. Once the user 105 has been alerted of the violation of any rules and regulations 135, the system 100 may proceed to the terminate method step 735.

In one preferred embodiment, the system 100 may create a registration strategy 815 using the catch log data obtained by the system 100. In a preferred embodiment, the system 100 may present the registration strategy 815 via the user interface 111. As illustrated in FIGS. 8-10, fishing regulations get particularly confusing when fishing in multiple geolocations that have different relevant rules and regulations 135. The registration strategy 815 may provide the user 105 with information that may prevent the user 105 from accidentally violating any rules and regulations 135. This is especially true of situations in which a seemingly innocent action may result in a violation of relevant rules and regulations 135 in one geolocation and not in another geolocation during the same fishing trip. Alternatively, an angler may not be aware that they are not violating rules and regulations 135 by fishing in a given geolocation should they stick to a particular registration strategy 815.

For instance, FIG. 8 depicts a hypothetical fishing trip in which a user 105 has a launch geolocation 805 from Mississippi and heads due south into Louisiana's waters. The user 105 then begins fishing in Louisiana and catches four Redfish, resulting in four catch geolocations in Louisiana. The user 105 is now under the rules and regulations 135 relevant to Louisiana waters because the user 105 last fished in Louisiana. The rules and regulations 135 relevant to Louisiana's waters allow a licensed angler may keep up to five Redfish. When the user 105 is finished fishing in Louisiana waters, the user 105 heads back to Mississippi's waters. As long as the user 105 doesn't stop anywhere in Mississippi's waters besides a terminal geolocation 820, a geolocation in which the user 105 officially terminates their fishing trip, the user 105 will not be in violation of any relevant rules and regulations 135 because the relevant rules and regulations 135 are those that apply to Louisiana's waters. However, if the user 105 does stop in Mississippi's waters for a reason other than terminating their fishing trip, Louisiana's rules and regulations 135 will likely no longer apply. Instead the user 105 will be subject to rules and regulations 135 relevant to Mississippi's waters, and because Mississippi's rules and regulations 135 limit the amount of Redfish to three, the user 105 will now be in violation of the rules and regulations 135 of Mississippi. The system 100 of the preferred embodiment may alert the user 105 via a registration strategy 815 to not stop in Mississippi waters for any reason other than to terminate their fishing trip or potentially be in violation of Mississippi's rules and regulations 135.

For instance, FIG. 9 depicts a hypothetical fishing trip in which a user 105 has a launch geolocation 805 from Mississippi and fishes in Mississippi waters. The user 105 catches one Redfish in Mississippi waters, resulting in one catch geolocation in Mississippi, and heads due south into Louisiana's waters. The user 105 then begins fishing in Louisiana and catches one more Redfish, resulting in a catch geolocation in Mississippi. The rules and regulations 135 relevant to Louisiana's waters allow a licensed angler to keep up to five redfish. However, the user 105 may not know that the rules and regulations 135 of Louisiana apply, believing that she may only catch one more Redfish due to the rules and regulations 135 relevant to Mississippi's waters. The system 100 may provide the user 105 with more than one registration strategy 815, alerting the user 105 that there is an option to catch more than three Redfish. For instance, one registration strategy 815 may recommend the user 105 continue to fish in Louisiana waters for up to five Redfish. However, the registration strategy 815 will alert the user 105 that this registration strategy 815 requires the user 105 not stop in Mississippi waters until she has reached a terminal geolocation 820. Another registration strategy 815 may recommend that the user 105 may return to Mississippi's waters and catch one more Redfish, however, doing so will subject the user 105 to rules and regulations 135 relevant to Mississippi's waters.

For instance, FIG. 10 depicts a hypothetical fishing trip in which a user 105 has a launch geolocation 805 from Alabama and fishes a river in Alabama waters. The user 105 catches marine life in Alabama waters, resulting in catch geolocations in Alabama. When the user 105 reaches a particular geolocation on the river, the river is no longer fully in Alabama waters. The north side of the river is in Alabama waters; however, the south side of the river is in Florida waters. If the user's 105 current catch log data is not in violation of the rules and regulations 135 relevant to Florida waters, the system 100 may indicate that the user 105 may fish in Florida waters. If the system 100 determines that the user's 105 catch log data is in violation of rules and regulations 135 relevant to Florida's waters, the system 100 may warn the user 105 not fish the south side of the river. Further, if the user 105 is able to legally fish in Florida's waters but then catches fish in Florida's waters that would place the user 105 in a situation in which they may be violating rules and regulations 135 relevant to Alabama's waters, the system 100 may indicate to the user 105 that they may no longer fish the north side of the river. In a preferred embodiment, the system 100 may update the registration strategy 815 based on any new catch log data and geolocation data.

Figure 11:
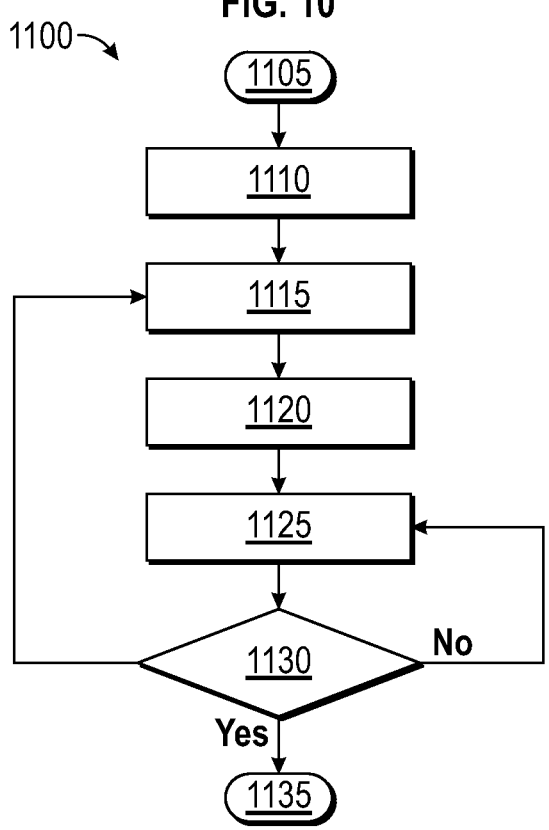
FIG. 11 is a flow chart illustrating certain method steps of a method embodying features consistent with the principles of the present disclosure.

FIG. 11 provides a flow chart 1100 illustrating certain, preferred method steps that may be used to carry out the method for creating a registration strategy 815 for a user 105 returning from a fishing trip. Step 1105 indicates the beginning of the method. During step 1110, the processor 115 may create a catch log profile 140 in the manners as described herein, wherein the catch log profile 140 contains rules and regulations 135 relevant to the user's 105 geolocation as well as catch log data. Once the catch log profile 140 has been created, the processor 115 may proceed to step 1115, wherein the system 100 may determine a registration strategy 815 using the rules and regulations 135 and the catch log data of the catch log profile 140. In one preferred embodiment, the system 100 may recommend a terminal geolocation 820, wherein the terminal geolocation 820 is the geolocation in which the user 105 may end their fishing trip without violating relevant rules and regulations 135. In another preferred embodiment, the registration strategy 815 may provide multiple terminal geolocations 820.

Once the system 100 has created a registration strategy 815, the processor 115 may display the registration strategy 815 to the user 105 via the user interface 111 during step 1120. In a preferred embodiment, the registration is displayed to a user 105 via a computing device 110. The system 100 may then perform a query to determine whether or not a user 105 has deviated from the registration strategy 815 during step 1125. Based on the results of that query, the system 100 may perform an action during step 1130. If the system 100 determines that the user 105 has deviated from the registration strategy 815, the system 100 may return to step 1115 and create a new registration strategy 815. If the system 100 determines the user 105 has not deviated from the registration strategy 815 nor completed the registration strategy 815, the system 100 may return to step 1125 and continue monitoring the user's 105 progress. If the system 100 determines that the user 105 has completed the registration strategy 815, the system 100 may proceed to termination step 1135. In one preferred embodiment, the system 100 may transmit a computer readable signal to the user 105 when there is a deviation from the registration strategy 815. For instance, should a user 105 stop in a geolocation to do something other than stop a fishing trip, the processor may transmit a computer readable signal that causes the user's 105 mobile computing device 110 to emit an alarm.

Figure 12:
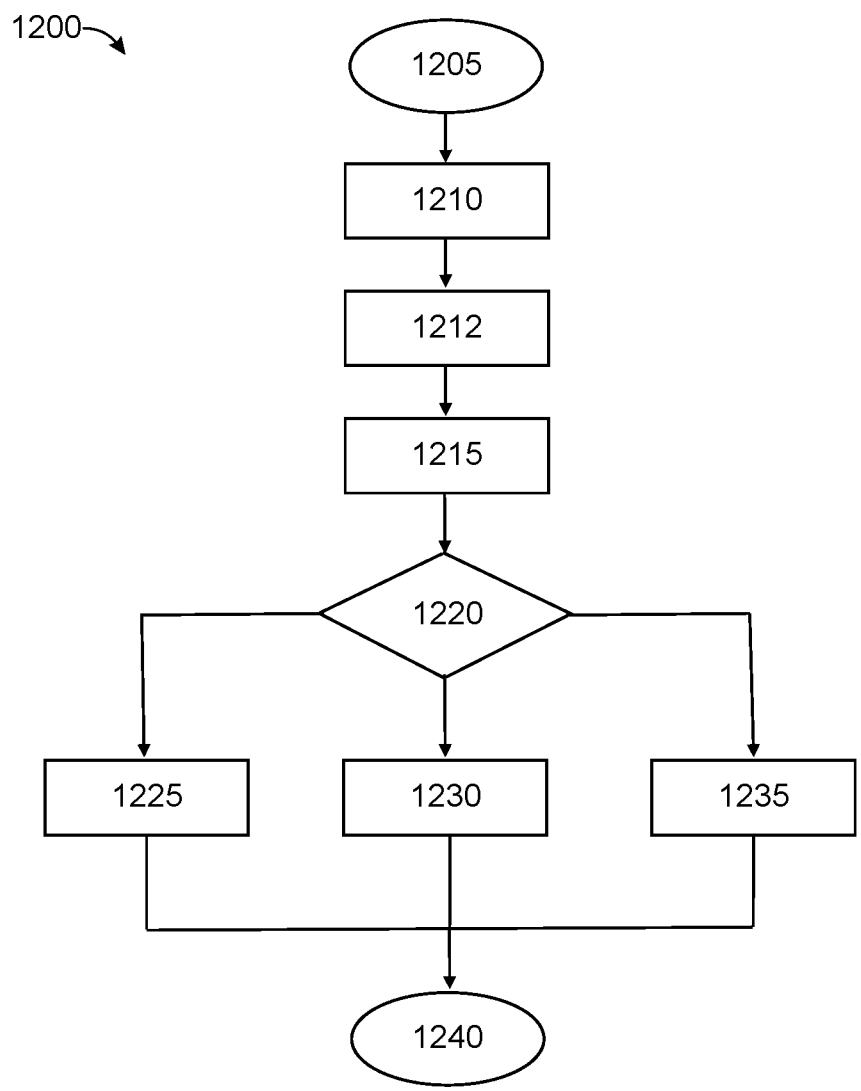
FIG. 12 is a flow chart illustrating certain method steps of a method embodying features consistent with the principles of the present disclosure.
Figure 13:
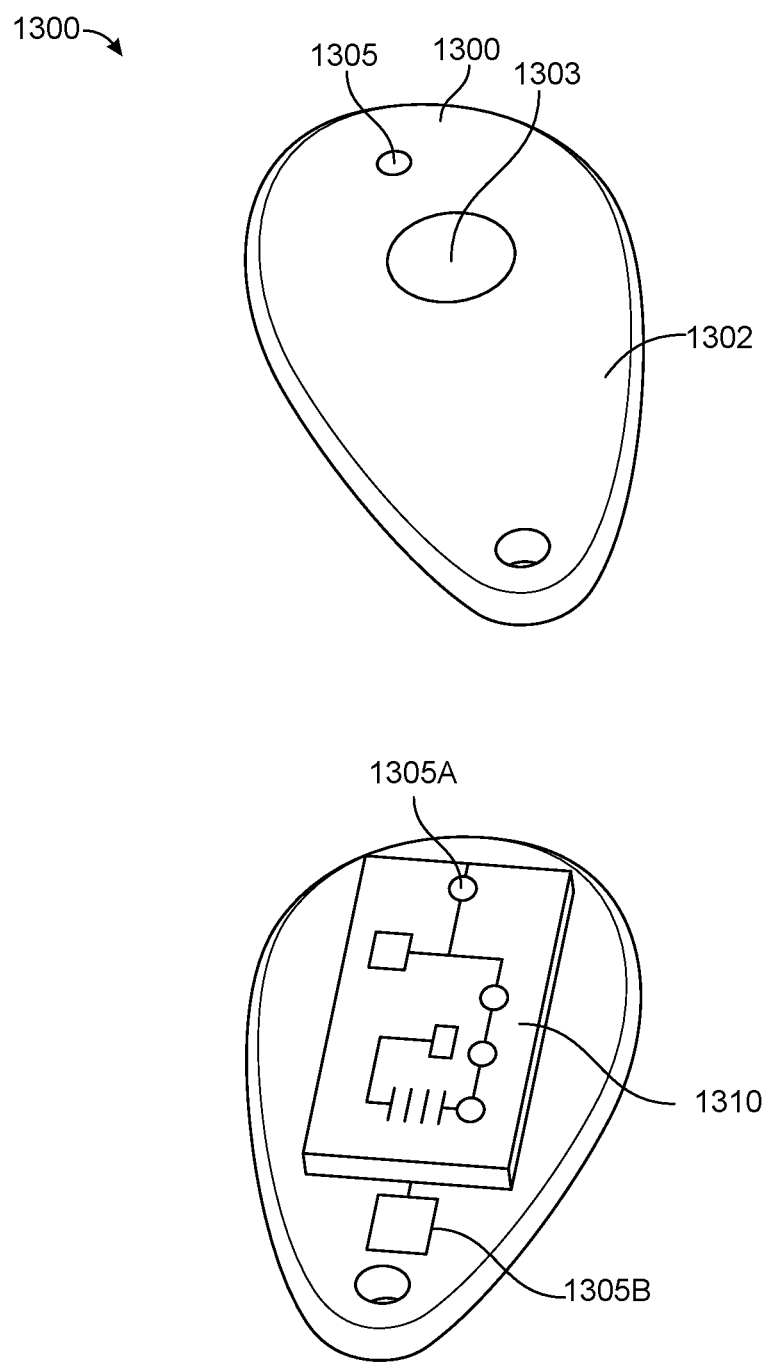
FIG. 13 is a diagram of a fob in which techniques described herein may be implemented.

FIG. 12 provides a flow chart 1200 illustrating certain, preferred method steps that may be used to carry out the method for inform a user 105 via a fob 1300 as to whether the user 105 is in violation of any rules and regulations 135 relevant to the geolocation in which fauna was caught. Step 1205 indicates the beginning of the method. During step 1210, the processor 115 may obtain audio data from the fob 1300. In one preferred embodiment, the system 100 may generate a computer readable signal to the fob 1300 indicating whether the audio data was successfully transferred to the processor 115. Once the audio data has been obtained, the system 100 may extract catch log data and save it to the user's 105 catch log profile 140 during step 1212. The processor 115 may then proceed to the perform query step 1215 to determine whether the user 105 has violated any rules and regulations 135 and/or if they are near a threshold of a rule or regulation 135. In step 1220, the system 100 may determine how to proceed based on the results of the query. If the processor 115 determines that the extracted catch log data is not violating any relevant rules and regulations 135, the method may proceed to step 1225. If the processor 115 determines there are relevant rules and regulations 135 violated by the catch log data, the processor 115 may proceed to step 1230. If the processor 115 determines no rules and regulations 135 have been violated but the user 105 is near a threshold of a rule or regulation 135 that would could cause them to be in violation of a rule or regulation 135 in the future, the processor 115 may proceed to step 1235.

During step 1225, the processor 115 may generate a computer readable signal that will cause an output device 1305 of the fob 1300 to alert the user 105 that they are not in violation of a rule or regulation 135. During step 1230, the processor 115 may generate a computer readable signal that will cause an output device 1305 of the fob 1300 to alert the user 105 that they are in violation of a rule or regulation 135. During step 1235, the processor 115 may generate a computer readable signal that will cause an output device 1305 of the fob 1300 to alert the user 105 that they are near a threshold of a rule or regulation 135 but not in violation of it. For instance, the processor 115 may transmit a computer readable signal to a fob 1300 comprising a vibration motor which may cause the vibration motor to vibrate a certain number of times based on whether the system 100 has determined if the user 105 has violated a rule or regulation 135 using the catch log data extracted from the audio data. For instance, the processor 115 may transmit a computer readable signal to a fob 1300 comprising a speaker which may cause the speaker to emit a sound indicative to the user 105 that they are in violation of a rule or regulation 135 or in near violation of a rule or regulation 135. Once the processor 115 has sent the computer readable signal to the fob 1300, the system 100 may proceed to terminate method step 1240.

The subject matter described herein may be embodied in systems, apparati, methods, and/or articles depending on the desired configuration. In particular, various implementations of the subject matter described herein may be realized in digital electronic circuitry, integrated circuitry, specially designed application specific integrated circuits (ASICs), computer hardware, firmware, software, and/or combinations thereof. These various implementations may include implementation in one or more computer programs that may be executable and/or interpretable on a programmable system including at least one programmable processor, which may be special or general purpose, coupled to receive data and instructions from, and to transmit data and instructions to, a storage system, and at least one input/output device.

These computer programs, which may also be referred to as programs, software, applications, software applications, components, or code, may include machine instructions for a programmable processor, and may be implemented in a high-level procedural and/or object-oriented programming language, and/or in assembly machine language. As used herein, the term "non-transitory computer-readable medium" refers to any computer program, product, apparatus, and/or device, such as magnetic discs, optical disks, memory, and Programmable Logic Devices (PLDs), used to provide machine instructions and/or data to a programmable processor, including a non-transitory computer-readable medium that receives machine instructions as a computer-readable signal. The term "computer-readable signal" refers to any signal used to provide machine instructions and/or data to a programmable processor. To provide for interaction with a user, the subject matter described herein may be implemented on a computer having a display device, such as a cathode ray tube (CRD), liquid crystal display (LCD), light emitting display (LED) monitor for displaying information to the user and a keyboard and a pointing device, such as a mouse or a trackball, by which the user may provide input to the computer. Displays may include, but are not limited to, visual, auditory, cutaneous, kinesthetic, olfactory, and gustatory displays, or any combination thereof.

Other kinds of devices may be used to facilitate interaction with a user as well. For instance, feedback provided to the user may be any form of sensory feedback, such as visual feedback, auditory feedback, or tactile feedback; and input from the user may be received in any form including, but not limited to, acoustic, speech, or tactile input. The subject matter described herein may be implemented in a computing system that includes a back-end component, such as a data server, or that includes a middleware component, such as an application server, or that includes a front-end component, such as a client computer having a graphical user interface or a Web browser through which a user may interact with the system described herein, or any combination of such back-end, middleware, or front-end components. The components of the system may be interconnected by any form or medium of digital data communication, such as a communication network. Examples of communication networks may include, but are not limited to, a local area network ("LAN"), a wide area network ("WAN"), metropolitan area networks ("MAN"), and the internet.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For instance, the implementations described above can be directed to various combinations and subcombinations of the disclosed features and/or combinations and subcombinations of several further features disclosed above. In addition, the logic flow depicted in the accompanying figures and/or described herein do not necessarily require the particular order shown, or sequential order, to achieve desirable results. It will be readily understood to those skilled in the art that various other changes in the details, materials, and arrangements of the parts and method stages which have been described and illustrated in order to explain the nature of this inventive subject matter can be made without departing from the principles and scope of the inventive subject matter.

What is claimed is:

1. A system comprising:
   a fob having a switch,
      wherein said switch causes a control board to obtain audio data via an input device,
   a processor operably connected to said fob,
   a power supply, and
   a non-transitory computer-readable medium coupled to said processor,
      wherein said non-transitory computer-readable medium contains rules and regulations relevant to a geolocation,
      wherein said non-transitory computer-readable medium contains instructions stored thereon, which, when executed by said processor, cause said processor to perform operations comprising:
         receiving said audio data from said fob,
         extracting catch log data from said audio data,
         saving said catch log data in a catch log profile, and
         transmitting a computer readable signal to said fob when said catch log data is saved within said catch log profile.

2. The system of claim 1, further comprising additional instructions stored on said control board, which, when executed by a microprocessor of said control board, cause said microprocessor to perform additional operations comprising:
   receiving said computer readable signal from said processor, and
   instructing an output device to perform an action that may alert a user that said catch log data has been saved within said catch log profile based on said computer readable signal.

3. The system of claim 1, further comprising additional instructions stored on said non-transitory computer-readable medium, which, when executed by said processor, cause said processor to perform additional operations comprising:
   comparing said catch log data to rules and regulations, and transmitting an alarm signal to said fob when said rules and regulations are violated.

4. The system of claim 3, further comprising additional instructions stored on said control board, which, when executed by a microprocessor of said control board, cause said microprocessor to perform additional operations comprising:
receiving said alarm signal from said processor, and
instructing an output device to perform an action that may alert a user that said rules and regulations have been violated based on said alarm signal.

5. The system of claim 3, wherein said additional instructions are stored within memory of said control board.

6. The system of claim 1, wherein said fob further comprises a wireless communication device, wherein said wireless communication device is configured to facilitate a transfer of information between said fob and said processor.

7. The system of claim 1, further comprising a database, wherein said catch log data is saved within said catch log profile of a plurality of catch log profiles within said database.

8. The system of claim 1, wherein information received by and transmitted from said processor is stored in said non-transitory computer-readable medium.

9. A system comprising:
a fob having a switch,
wherein said switch causes a control board to obtain audio data via an input device,
a processor operably connected to said fob,
a power supply, and
a non-transitory computer-readable medium coupled to said processor,
wherein said non-transitory computer-readable medium contains rules and regulations relevant to a geolocation,
wherein said non-transitory computer-readable medium contains instructions stored thereon, which, when executed by said processor, cause said processor to perform operations comprising:
receiving said audio data from said fob,
extracting catch log data from said audio data,
comparing said catch log data to rules and regulations, and
transmitting an alarm signal to said fob when said rules and regulations are violated.

10. The system of claim 9, further comprising additional instructions stored on said control board, which, when executed by a microprocessor of said control board, cause said microprocessor to perform additional operations comprising:
receiving said alarm signal from said processor, and
instructing an output device to perform an action that may alert a user that said rules and regulations have been violated based on said alarm signal.

11. The system of claim 10, wherein said additional instructions are stored within memory of said control board.

12. The system of claim 9, wherein said fob further comprises a wireless communication device, wherein said wireless communication device is configured to facilitate a transfer of information between said fob and said processor.

13. The system of claim 9, further comprising a database, wherein said catch log data is saved within a catch log profile of a plurality of catch log profiles within said database.

14. The system of claim 9, wherein information received by and transmitted from said processor is stored in said non-transitory computer-readable medium.

15. A system comprising:
a security system having an output device,
a processor operably connected to said security system,
an input device operably connected to said processor,
wherein said input device is configured to collect audio data containing catch log data,
a power supply, and
a non-transitory computer-readable medium coupled to said processor,
wherein said non-transitory computer-readable medium contains rules and regulations relevant to a geolocation,
wherein said non-transitory computer-readable medium contains instructions stored thereon, which, when executed by said processor, cause said processor to perform operations comprising:
receiving said audio data from said input device,
extracting said catch log data from said audio data,
comparing said catch log data to rules and regulations, and
creating an alarm signal based on said catch log data and rules and regulations.

16. The system of claim 15, Further comprising additional instructions stored on said non-transitory computer-readable medium, which, when executed by said processor, cause said processor to perform additional operations comprising:
instructing said output device to perform an action that alerts a user about a status of said catch log data and said rules and regulations.

17. The system of claim 16, wherein said additional instructions are stored within memory of a control board.

18. The system of claim 15, further comprising a fob having a wireless communication device operably connected to said security system,
wherein a said fob may receive said alarm signal and alert a user about a status of said catch log data and said rules and regulations.

19. The system of claim 18, further comprising an indoor positioning system, wherein said fob is recognized by said indoor positioning system, wherein said fob deactivates said security system.

20. The system of claim 15, further comprising a database, wherein said catch log data is saved within a catch log profile of a plurality of catch log profiles within said database.

* * * * *